United States Patent
Mizusawa et al.

(10) Patent No.: US 7,012,549 B2
(45) Date of Patent: Mar. 14, 2006

(54) PARKING ASSISTANCE APPARATUS

(75) Inventors: Kazufumi Mizusawa, Kawasaki (JP); Shusaku Okamoto, Hirakata (JP); Takashi Yoshida, Ikoma (JP); Ryosuke Iida, Yokohama (JP); Yuichi Hirama, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 323 days.

(21) Appl. No.: 10/128,016

(22) Filed: Apr. 23, 2002

(65) Prior Publication Data

US 2002/0175832 A1 Nov. 28, 2002

(30) Foreign Application Priority Data

Apr. 24, 2001 (JP) ............ P. 2001-126214
Sep. 12, 2001 (JP) ............ P. 2001-277045

(51) Int. Cl.
*B60Q 1/48* (2006.01)
(52) U.S. Cl. .................. 340/932.2; 348/118
(58) Field of Classification Search ......... 340/932.2; 348/119, 148, 113, 118; 701/1, 41
See application file for complete search history.

(56) References Cited

U.S. PATENT DOCUMENTS

| | | | |
|---|---|---|---|
| 6,476,730 B1 * | 11/2002 | Kakinami et al. | 340/932.2 |
| 6,654,670 B1 * | 11/2003 | Kakinami et al. | 701/1 |
| 2001/0027363 A1 * | 10/2001 | Shimazaki et al. | 701/41 |
| 2001/0030688 A1 * | 10/2001 | Asahi et al. | 348/118 |

FOREIGN PATENT DOCUMENTS

| | | |
|---|---|---|
| EP | 1 022 903 A3 | 3/2001 |
| JP | 11-334470 | 12/1999 |
| JP | 2000-78566 | 3/2000 |
| JP | 2000-168475 | 6/2000 |
| WO | WO 01/25054 A1 | 4/2001 |

OTHER PUBLICATIONS

Patent Abstracts of Japan, Koreishi Jun, "Parking Auxiliary Device", Publication No. 10244891, Publication Date Sep. 14, 1998, 1 page.
Patent Abstracts of Japan, Sakakibara Seiji, "Parking Support Device", Publication No. 2000168475, Publication date Jun. 20, 2000, 1 page.
Patent Abstracts of Japan, Sako Kazuya, "Parking Assist Device for Vehicle", Publication No. 2000177512, Publication date Jun. 27, 2000, 1 page.
Patent Abstracts of Japan, Yamada Satoyuki, "Steering Support Device in Tandem Parking", Publication No. 20001071842, Publication date Mar. 21, 2001, 1 page.

* cited by examiner

Primary Examiner—Thomas Mullen
(74) Attorney, Agent, or Firm—Pearne & Gordon LLP

(57) ABSTRACT

Parking assistance apparatus that displays on a screen an image shot by image picking-up apparatus mounted on a vehicle. The parking assistance apparatus superimposes a guide line that is parallel to the line tangent to the predicted outer locus of the vehicle assumed when the vehicle is backed with the wheel at the maximum steering angle. This allows the driver to drive the vehicle so that the guide line will not overlap the image of another vehicle thus allowing parking that avoids any contact.

30 Claims, 33 Drawing Sheets

IMAGE FROM CAMERA L  IMAGE FROM CAMERA R

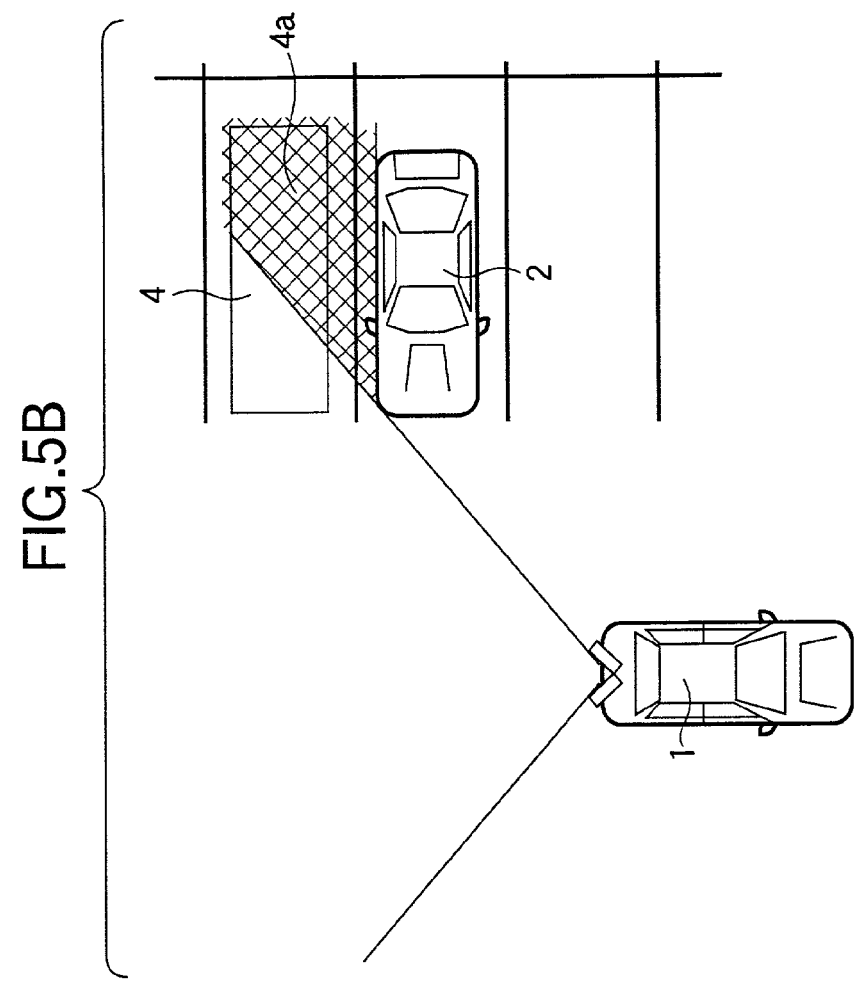
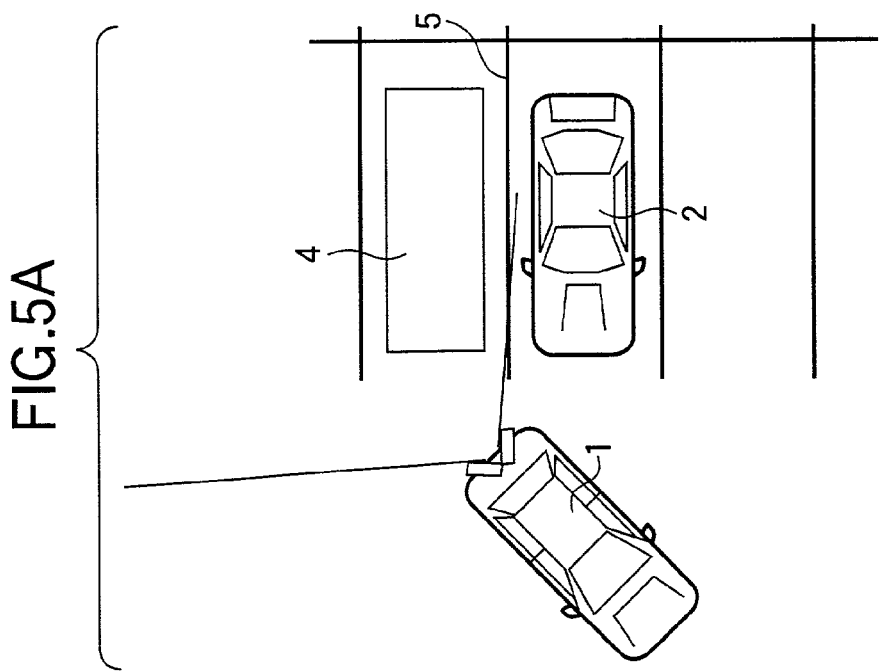
FIG.5B
FIG.5A

PARKING ASSISTANCE APPARATUS

BACKGROUND OF THE INVENTION

1. Field of the Invention

The present invention relates to parking assistance apparatus for assisting parking by picking up the rear direction of a vehicle by using a vehicle-mounted camera and displaying the resulting image on a screen that can be viewed from the driver's seat, and in particular to parking assistance apparatus for assisting parking by superimposing a guide on the screen.

2. Description of the Related Art

Driving assistance apparatus has been in widespread use that provides the driver of the view at the rear direction of a vehicle without the driving looking into a rearview mirror, by mounting a vehicle-mounted camera on the rear trunk of a vehicle in a rear direction and presenting the image obtained from the vehicle-mounted camera to the driver. In particular, in recent years, driving assistance apparatus has been on the market (for example, Japanese Patent Laid-Open Hei 11-337740) that superimposes the predicted locus of the tires of a vehicle corresponding to the steering angle on the image shot by the camera and presented to the driver in order to notify the predicted direction of the vehicle.

However, driving assistance apparatus that superimposes the predicted travel locus moving with the variation in the steering angle on the image shot by a vehicle-mounted camera has outstanding problems.

A first problem is that a steering angle sensor is expensive and a processing unit to compute the predicted locus of the travel direction of the tires by using sensor information from the steering angle sensor is also required thus increasing the price of the vehicle. A second problem is that errors in the predicted locus are accumulated as the steering angle sensor is used for longer time thus causing a displacement from the actual locus. Another problem is that an unskilled driver cannot easily determine the parking start position or timing to turn back the wheel when he/she has checked the predicted locus moving with the variation in the steering angle of the wheel. The driver needs some practice before he/she has accustomed to the system.

Thus, as driving assistance apparatus that allows easy parking without using a steering angle sensor is provided for example in the Japanese Patent Laid-Open Hei 12-078566 or Japanese Patent Laid-Open 2000-168475.

To perform end-to-end parking or side-by-side parking of a vehicle including parking of a vehicle in a garage, parking is often accomplished by backing the vehicle with wheel position fixed (for example steering to left) once the start position of parking is found. A related art technology described in the Japanese Patent Laid-Open Hei 12-078566 focuses on this fact and discloses a technology that superimposes on the image picked up by a vehicle-mounted camera the vehicle space at the destination the vehicle is expected to reach in case the vehicle is backed with the wheel turned at the maximum steering angle.

A related art technology described in the Japanese Patent Laid-Open 2000-168475 guides the parking procedure by displaying the predicted vehicle travel locus assumed when the wheel is steered. This is based on the idea that the driver has only to steer the wheel to back the vehicle once he/she has guided the vehicle so that the destination of the predicted locus will reach the parking space. This philosophy is basically the same as the related art in the Japanese Patent Laid-Open Hei 12-78566.

FIG. 37 is a schematic view of a screen display example of related art driving assistance apparatus. In FIG. 37, a rear end 1a of the vehicle and a rectangular area guide 1b showing as a guide the approximate size of the vehicle space are displayed. Assume a case where the vehicle 1 is parked into parking space 4 before another vehicle 2 that is parked, as shown in FIG. 38A. In this case, the driver watches the screen display shown in FIG. 38B and moves the vehicle 1 so that the position of the area guide 1b described referring to FIG. 37 will match the space adjacent to an image 2a of another vehicle 2. Then, backing the vehicle with the wheel fully turned to the left brings the vehicle 1 into the space of the area guide 1b. The driver has only to position the vehicle at the start of parking procedure so that the position of the area guide on the screen matches the target location, then back the vehicle with the wheel steered.

Related art driving assistance apparatus in FIGS. 38A and 38B still has problems that the alignment of the vehicle at completion of parking is difficult and that the vehicle could come in contact with another vehicle.

Related art apparatus described in the Japanese Patent Laid-Open Hei 12-078566/2000 assumes parking by backing a vehicle until the vehicle turns 90 degrees with the steering angle set to the maximum. Thus, the parking space shown in the area guide is too far from the parking start position so that the parking space (area guide) in the screen is very small thus making it difficult to align the vehicle at the end of parking. That is, the position of the vehicle at the end of parking is often too close to or too far from the adjacent vehicle.

The method to change the direction of a vehicle 90 degrees at once differs from the vehicle guidance method of side-by-side parking conventionally used by many drivers, which perplexes the driver. As shown in FIG. 39, the related art vehicle guidance method of side-by-side parking comprises: the step of driving the vehicle 1 to bring the vehicle close to the parking space 4 with the vehicle at perpendicular to the parking space 4 (step P1); the step of directing the rear of the vehicle toward the parking space 4 by advancing the vehicle with the wheel turned in the direction opposite to the parking space (step P2); turning back the wheel and backing the vehicle to place the vehicle in the center of the parking space 4 parallel to other vehicles (step P3); and backing the vehicle with the wheel held straight to place the vehicle in the parking space 4 (step P4). It is a problem to oblige the driver to follow a parking method other than this approach. Rather, it is preferable to diffuse driving assistance apparatus to assist the related art vehicle guidance method for side-by-side parking.

In related art apparatus described in the Japanese Patent Laid-Open 2000-168475, only the predicted travel locus assumed when the wheel is in straight position and when the wheel is steered. In case the parking space is split by a parking border line painted on the road surface, it is possible to back the vehicle using the parking border line as a guide. In the absence of a parking border line, the driver must use the predicted travel locus on the screen as a guide to back the vehicle. In such a case, the vehicle has a higher possibility to come in contact with an adjacent vehicle. This will be explained referring to FIGS. 40A and 40B.

FIG. 40A shows the state of the step P3 for side-by-side parking. A parking border line shown by a numeral 5 in FIG. 39 is not displayed on the road surface. FIG. 40B shows the image shot by a vehicle-mounted camera on the screen, where the predicted travel locus of the vehicle is superimposed. FIG. 40B shows that the predicted travel locus shows that the predicted travel locus 6 while the wheel is steered grazes a point between the front tire and the rear tire of the image of the vehicle parked in the parking space. As seen from this image, the predicted travel locus 6 does not overlap the adjacent vehicle image 2. So, it seems that backing the vehicle as indicated does not bring the vehicle in contact with the adjacent vehicle 2.

However, checking the detailed situation, the predicted travel locus 6 crosses the straight line LT connecting the ground points of the front and rear tires of the vehicle image 2a. It is sure that backing the vehicle in this direction brings the vehicle 1 into contact with the adjacent vehicle 2. As such, using the predicted travel locus alone makes it difficult to determine the contact of the vehicle with surrounding vehicles.

SUMMARY OF THE INVENTION

An object of the invention is to provide parking assistance apparatus that can improve the alignment accuracy of the parking start position.

Another object of the invention is to provide parking assistance apparatus that assists parking by using a method similar to the vehicle guidance method in a parking procedure often conventionally employed by a large number of drivers.

Another object of the invention is to provide parking assistance apparatus that allows easy determination on the contact with surrounding obstacles.

The aforementioned objects are attained by providing parking assistance apparatus that displays on a screen an image shot by image picking-up means mounted on a vehicle, characterized in that said parking assistance apparatus comprises control means for superimposing on said screen a guide parallel to a line that is tangent to the outer predicted travel locus of said vehicle and apart from said outer predicted travel locus at a required distance in said outer direction assumed when said vehicle is backed with the wheel of said vehicle operated. With this configuration, it is possible to know in the screen a contact with an obstacle such as an adjacent vehicle assumed when the steering angle is operated. This avoids any contact with an obstacle in advance.

The objects are attained by providing parking assistance apparatus that displays on a screen the image shot by image picking-up means mounted on a vehicle, characterized in that said parking assistance apparatus comprises control means for superimposing on said screen a guide parallel to a line that is tangent to the outer predicted travel locus of said vehicle and apart from said outer predicted travel locus at a required distance in said outer direction assumed when said vehicle is backed with the wheel of said vehicle at the maximum steering angle. With this configuration, it is possible to grasp the possibility of contact with an adjacent vehicle when the wheel is turned to its limit even in a vehicle where a steering angle sensor is not mounted. This allows a driver who is not skilled in driving to move the vehicle to the parking start position referring to guide lines and perform side-by-side parking or end-to-end parking without undue stress.

Preferably, said parking assistance apparatus is characterized in that said guide is a guide line. Discrete points may be displayed as a guide but display as lines facilitates determination on the possibility of contact.

Preferably, said parking assistance apparatus is characterized in that the control means comprises means for superimposing on said screen an auxiliary guide line for assisting said guide line, said auxiliary line extending in the direction that crosses said guide line at a predetermined angle. With this configuration, it is easy to grasp the position of the vehicle from the display of the auxiliary line even in case the relation between the guide line and the target object is not clear.

Preferably, said parking assistance apparatus is characterized in that said control means comprises means for superimposing on said screen a guide parallel to a line that is tangent to the outer predicted travel locus of said vehicle and at a required distance from said outer predicted travel locus in said outer direction assumed when said vehicle is backed with the wheel of said vehicle at the maximum steering angle in the direction opposite to said guide line. With this configuration, the minimum turning radius of the vehicle assumed when the wheel is turned in the opposite direction is known from an auxiliary line, thus making it easy to determine a contact with another object that may take place when the wheel is turned in the opposite direction. This makes it possible to easily grasp the timing of turning back the wheel.

Preferably, said parking assistance apparatus is characterized in that the angle formed by said guide line and said auxiliary line is 90 degrees. A guide line is parallel to a predicted locus so that an auxiliary line is perpendicular to the predicted locus. When the guide line becomes parallel to the vehicle, the auxiliary guide line becomes parallel to the rear end line of the vehicle. This clarifies the relation between the vehicle and the guide line.

Preferably, said parking assistance apparatus is characterized in that said display means displays a mark indicating a vehicle width or a mark indicating a vehicle width having a required distance margin. Display of this mark allows a driver to check the width of the vehicle or width of the vehicle with a margin on the guide line thus facilitating determination on the relation to other objects or parking start position.

The aforementioned objects are attained by parking assistance apparatus that displays an image shot by image picking-up means mounted on a vehicle, characterized in that said parking assistance apparatus comprises control means for superimposing on said screen cross-shaped guide lines slanted 45 degrees right and left away from the center axis of said vehicle and at a predetermined distance from the rear end of said vehicle. With his configuration, it is made easy to determine whether the vehicle is slanted 45 degrees away from the target thus allowing a beginner to easily park a vehicle.

Preferably, said parking assistance apparatus is characterized in that said control means forms cross-shaped guide lines with two guide lines parallel to lines that are tangent to the outer predicted travel locus of said vehicle and at a required distance from said outer predicted travel locus in said outer direction assumed when said vehicle is backed with the wheel of said vehicle at the maximum right/left steering angle. This allows the cross-shaped guidelines to be shared by parking in the right direction and in the left direction. The guide lines are thus simple and have wide applications.

Preferably, said parking assistance apparatus is characterized in that said control means displays intersection marks and marks indicating the positions away from said intersection points by the vehicle width or marks indicating the positions away from said intersection points by the vehicle width having a required distance margin.

Display of these marks allows a driver to check the width of the vehicle or width of the vehicle with a margin on the guide line thus facilitating determination on the relation to other objects or parking start position.

Preferably, said parking assistance apparatus is characterized in that said picked up image displayed on said screen has undergone processing to remove lens distortion of said shooting apparatus. This displays a straight line in the real space as a straight line on the screen, thus allowing the driver to intuitively grasp the orientation of the vehicle or coincidence of a guide line with the target.

Preferably, said parking assistance apparatus is characterized in that said picked up image displayed on said screen has undergone viewpoint conversion processing to convert an image shot by said image picking-up means to an image shot by an imaginary camera installed at an arbitrary position. A camera must be installed in a limited place so that it is difficult to pick up an optimum image by using a vehicle-mounted camera that can be used as a reference to parking. The viewpoint conversion processing converts an image to one obtained when a camera is assumed in an optimum place. This obtains an optimum image for parking. In this case, the viewpoint conversion processing preferably provides the same straight line in the image after viewpoint conversion as in a real space. This makes it easy to grasp the relationship on the screen and to determine whether the vehicle is parallel to or perpendicular to another vehicle or a parking border line.

Preferably, said parking assistance apparatus is characterized in that said picked up image has undergone the viewpoint conversion processing where a straight line in the real space is represented in an image after viewpoint conversion. A straight line in the real space is displayed as a straight line, which assures an easy-to-watch display.

Preferably, said parking assistance apparatus is characterized in that said parking assistance apparatus displays said guide lines in accordance with the rules of perspective. That is, a farther line is displayed in a thin line, and a closer line is displayed in a bold line. Guide lines are displayed as drawn on the road surface. This eliminates a sense of incongruity on the part of a driver.

The aforementioned objects are attained by providing parking assistance apparatus characterized in that said parking assistance apparatus displays, rather than said guide lines, points equidistantly arranged by a predetermined distance on said guide lines.

Preferably, said parking assistance apparatus is characterized in that said guide lines are displayed by changing the display colors of the areas split by said guide lines. This simplifies a guide on the screen thus providing an easy-to-watch guide.

The aforementioned objects are attained by providing parking assistance apparatus that displays on a screen an image shot by image picking-up means mounted on a vehicle, characterized in that said parking assistance apparatus comprises control means including means for splitting said screen into a first area for displaying an area in the neighborhood of a vehicle and a second area for displaying the area except said area in the close proximity of the vehicle, means for viewpoint-converting an image of the neighborhood of a vehicle out of said image to an image where a straight line in the real space is represented in a straight line on the screen and displaying the resulting image in said first area, means for displaying in said second area an image of the neighborhood of a vehicle out of said image as a panoramically viewpoint-converted image continuous to the image displayed in said first area, and means for displaying the boundary of said first area and said second area.

Preferably, said parking assistance apparatus is characterized in that said means for displaying the boundary displays separately the range where said vehicle can pass and the range where the vehicle cannot pass. With this configuration, the range where the vehicle does not pass with the wheel steered is made clear thus facilitating determination on a contact with other objects.

Preferably, said parking assistance apparatus is characterized in that said parking assistance apparatus superimposes a guide such as the aforementioned guide on the screen split into two areas with a boundary. With this configuration, the parking procedure is made easier.

The aforementioned objects are attained by providing parking assistance apparatus that displays on a screen an image picked up by image picking-up means mounted on a vehicle, characterized in that said parking assistance apparatus comprises control means for superimposing on said picked up image a guide showing the range where said vehicle passes when said vehicle is backed. With this configuration, the range where the vehicle does not pass with the wheel steered is made clear thus facilitating determination on a contact with other objects.

Preferably, said parking assistance apparatus is characterized in that said parking assistance apparatus superimposes on said screen the guide lines as well as a guide showing the range where said vehicle passes when said vehicle is backed. With this configuration, the parking procedure is made easier.

BRIEF DESCRIPTION OF THE DRAWINGS

FIG. 5A shows the vehicle placed near the parking space 45 degrees slantwise away from the parking space.

FIG. 5B shows the parking start position assumed when the vehicle is turned 90 degrees at a time with respect to the parking space.

DESCRIPTION OF THE PREFERRED EMBODIMENTS

An embodiment of the invention will be described referring to drawings.

Figure 1:
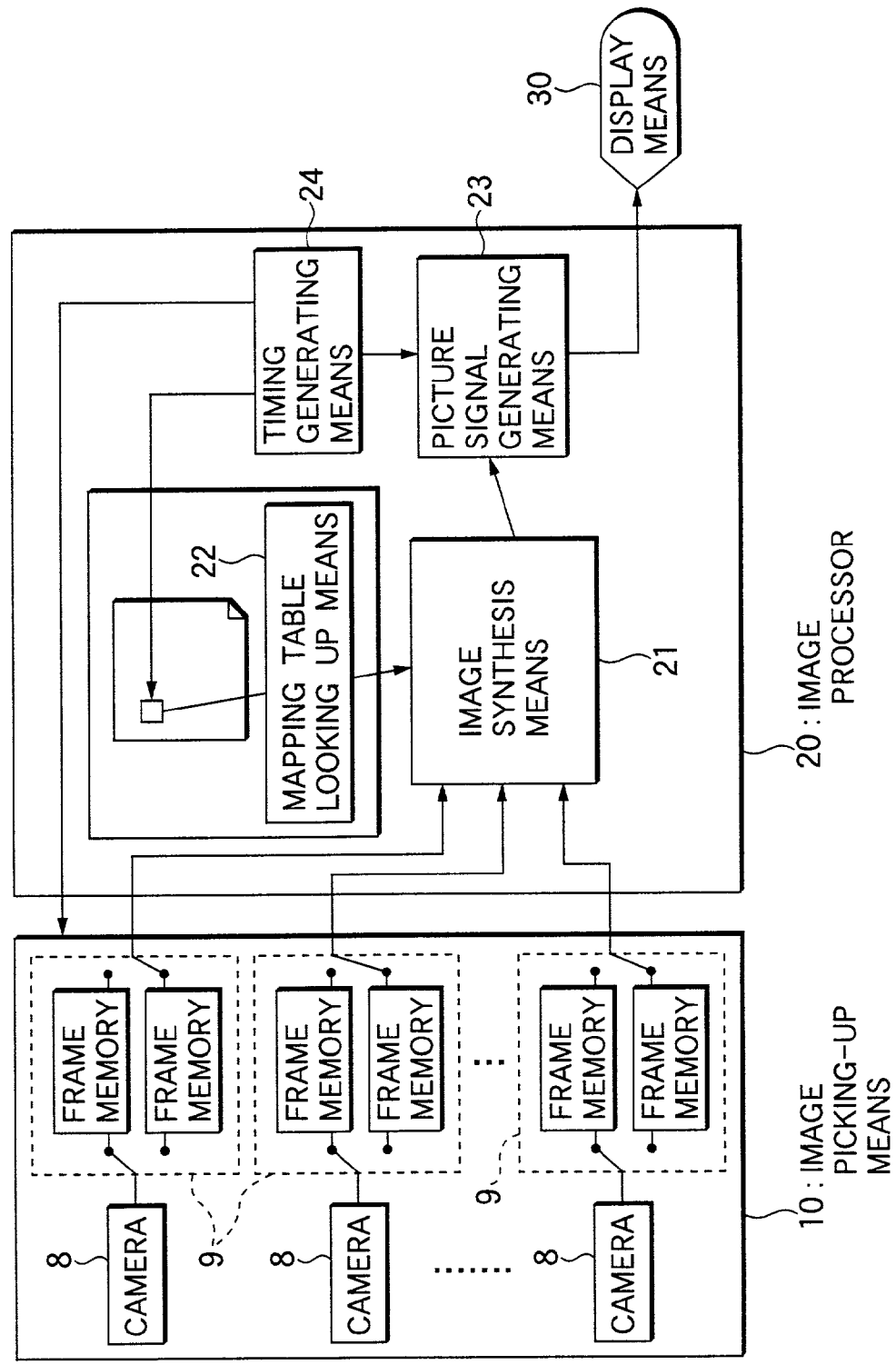
FIG. 1 is a block diagram of parking assistance apparatus according to an embodiment of the invention.

FIG. 1 is a block diagram showing parking assistance apparatus according to an embodiment of the invention. Parking assistance apparatus according to the invention comprises image picking-up means 10, an image processor 20 as control means of this embodiment, and display means 30.

The image picking-up means 10 comprises N pieces of image picking-up means mounted on a vehicle. For example, the image picking-up means comprises a total of eight cameras: two cameras mounted on the front of the vehicle for monitoring the front of the vehicle; two cameras mounted on the left side of the vehicle for monitoring the left side of the vehicle; two cameras mounted on the right side of the vehicle for monitoring the right side of the vehicle; and two cameras mounted on the rear of the vehicle (rear-view camera) for monitoring the rear of the vehicle.

Each camera 8 is typically a color or monochrome digital camera having a solid picking up device such as a CCD or CMOS device. Each camera is composed of for example a combination of lenses, a prism and a mirror (not shown). Each camera may be configured so that incident light passing through the lenses, prism and mirror will be transmitted to a shooting device at a distance.

The image picking-up means 10 further comprises two frame memories per camera. While one frame memory is retrieving picked up images from a camera, the image processor 20 is reading the stored information in the other frame memory (picked up image at the preceding retrieve timing).

The image processor 20 comprises image synthesis means 21 for retrieving and synthesizing picked up images from each camera 8, mapping table looking-up means 22 for performing high-speed processing of image synthesis, picture signal generating means 23 for converting an image generated by the image synthesis means 21 to a picture signal, timing generating means 24 for outputting a timing signal to the image picking-up means 10, mapping table looking-up means 22, and picture signal generating means 23.

The image synthesis means 21 inputs picked up images from each camera 8 and processes these picked up images. The processing includes (1) image transformation processing and (2) synthesis of transformed partial images (including boundary processing). The processing (1) and (2) may be made separately or all or partial processing may be made in one process. The example in FIG. 1 comprises a mapping table in order to perform processing of picked up images in one process.

The mapping table is a table for performing high-speed conversion of position coordinates of the pixels of a picked up image to position coordinates of pixels of a synthesized image. Position coordinates of the pixels of a picked up image may correspond to position coordinates of pixels of a synthesized image on a one-to-one basis or plurality-to-one basis. Whether position coordinates of the pixels of a picked up image may correspond to position coordinates of pixels of a synthesized image on a one-to-one basis or plurality-to-one basis depends on where each camera is mounted and what synthesized image is generated. For example, in case boundary processing is made at the boundary of a picked up image, position coordinates of the pixels of a picked up image may not correspond to position coordinates of pixels of a synthesized image on a one-to-one basis.

Figure 2:
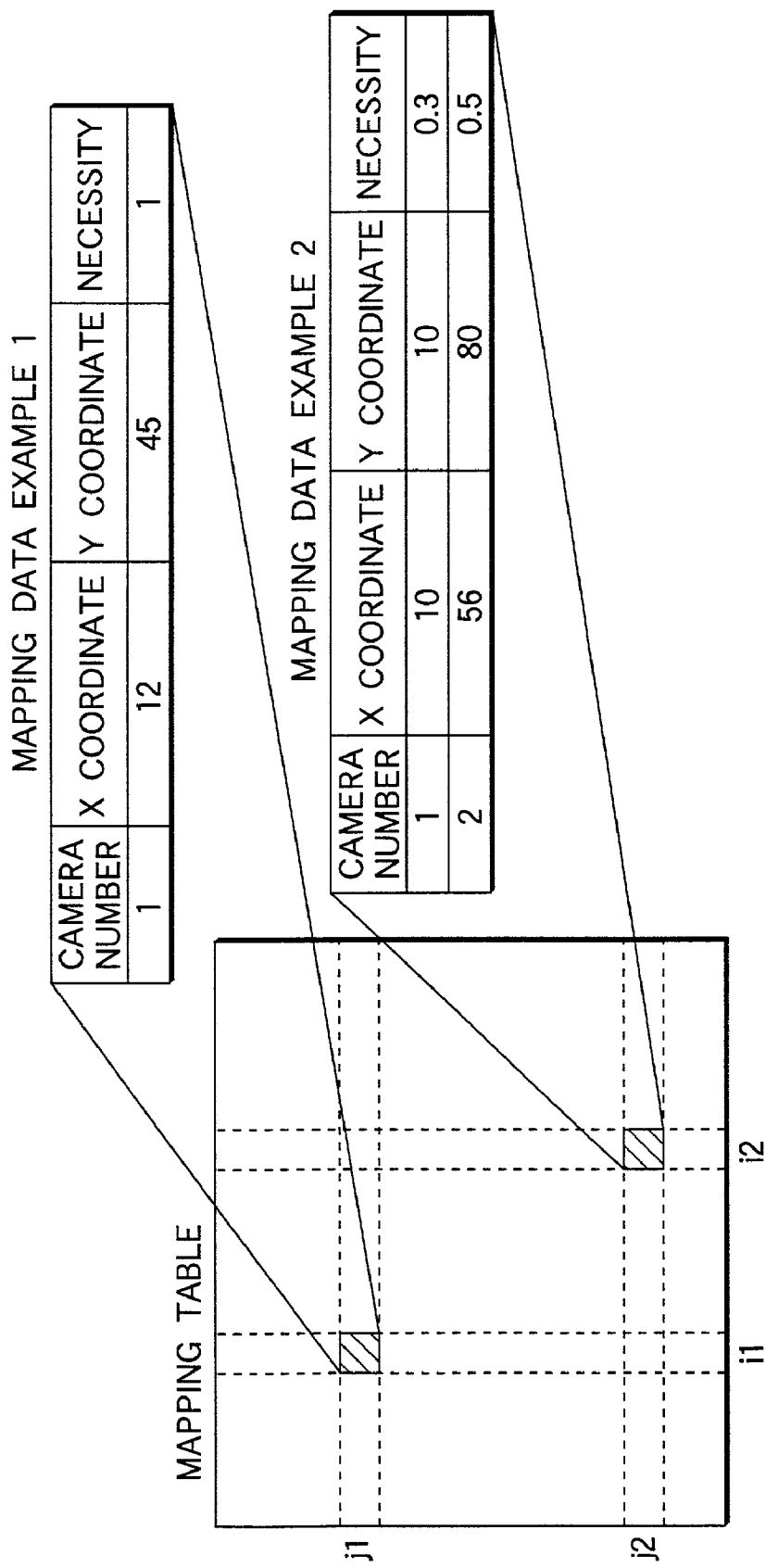
FIG. 2 explains a mapping table.

FIG. 2 shows an example of a mapping table. In this example, correspondence between a synthesized image and mapping data is indicated based on the pixel coordinates (i, j) of a synthesized image. The pixel coordinate (i1, j1) is a pixel of an image picked up by the camera 8, and is provided with data of the X coordinate and Y coordinate (12, 45) of picked up image, and data of necessity (1.0) on a per coordinate basis (mapping data example 1). In the example of FIG. 2, pixel data of the picked up image (12, 45) having necessity "1", that is the pixel data of the picked up image is directly copied to the pixel coordinates (i1, j1) of a synthesized image.

Meanwhile, pixel coordinate (i2, j2) corresponds to the section where an image picked up by the camera 8 (camera number 1) overlaps an image shot by the adjacent camera 8 (camera number 2). X and Y coordinate data and necessity data of images picked up by each camera 8 having the camera numbers 1 and 2 are provided (mapping data example 2).

In this case, the pixel value of (i2, j2) can be determined for example as follows:
Pixel value={(pixel value of coordinates of camera number 2 (56, 80))×0.5+(pixel value of coordinates of camera number 1 (10, 10))×0.3}/(0.5+0.3).

By creating a table that represents this correspondence through calculation or manual work, it is possible to generate at a high speed a synthesized image representing the whole ground around a vehicle and a synthesized image representing a part of the whole ground around a vehicle (for example the rear ground of a vehicle or side ground of a vehicle). For example, an image to represent a wide range in one screen generated by synthesizing side by side the picked up images of a camera for shooting the rear left area and a camera for shooting the rear right area may be synthesized at a high speed by using this mapping table.

Mapping tables may be provided in the image synthesis means 21 or external to the image synthesis means 21. A processor (not shown) in the image synthesis means 21 generates synthesized images at a high speed by referencing any of the mapping tables for generating necessary synthesized images. It goes without saying that a faster processor can generate synthesized images without using mapping tables.

Specifically, a mapping table is written into a ROM (including erasable programmable ROM such as EEPROM) or RAM. A mapping table may be written into a RAM or ROM by the processor in the aforementioned image synthesis means 21 while calculating the mapping table data. Or, for example, mapping table data provided as firmware may be written into the RAM or ROM by using data transfer means such as a communication line and disk drive.

The display means 30 is typically a liquid crystal display and may be another display device such as a plasma display. The display means 30 may be also used as a vehicle-mounted GPS terminal display (so called car navigation system display) or separately provided.

Figure 3:
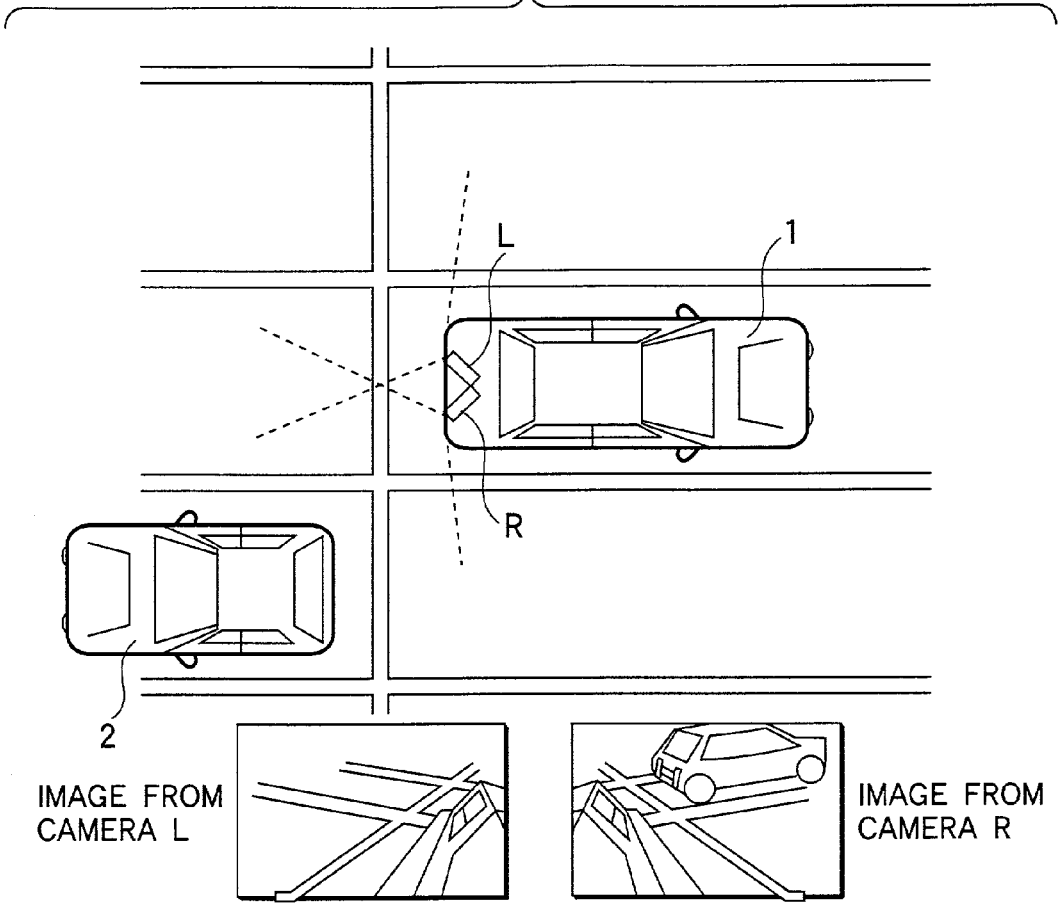
FIG. 3 explains the mounting positions of two rearview cameras mounted on a vehicle and picked up images from the rearview cameras.
Figure 4:
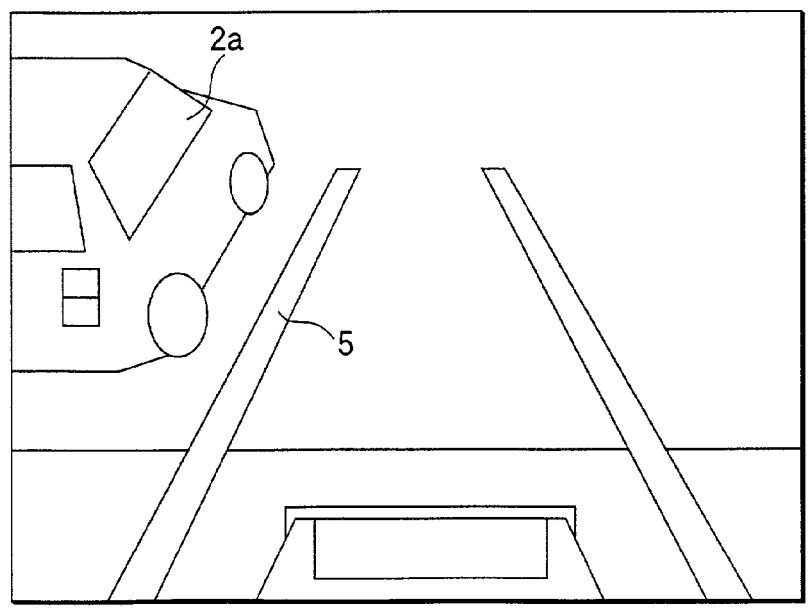
FIG. 4 shows an image created by synthesizing picked up images from the two rearview cameras shown in FIG. 3.

FIG. 3 is a schematic view showing the vehicle-mounting position of two cameras L, R for shooting the rear direction of a vehicle and picked up images from each camera L, R. In this example, the two cameras L and R are mounted back to back across the longitudinal center line of the vehicle in order to obtain a 180-degree view of the rear of the bumper of the vehicle. FIG. 4 shows a schematic view of a synthesized image of the rear direction of a vehicle from an image from each camera L and R using the aforementioned mapping table. Also, in this example of FIG. 4, images from two cameras are synthesized and viewpoint-converted so that the parking border line 5 which is adjacent to an image 2a of another vehicle 2 is displayed as a straight line.

A vehicle-mounted camera has to shoot a wide range of images so that a wide angle camera is used. Thus, the picked up image is considerably distorted. It is preferable to provide an image where distortion due to camera lenses is removed, when a picked up image is converted and synthesized into a real image using mapping tables. FIG. 4 is an example of a synthesized image by two cameras. For a single wide angle camera also, a similar image is obtained by removing lens distortion in order to display a parking border line as a straight line.

Figure 39:
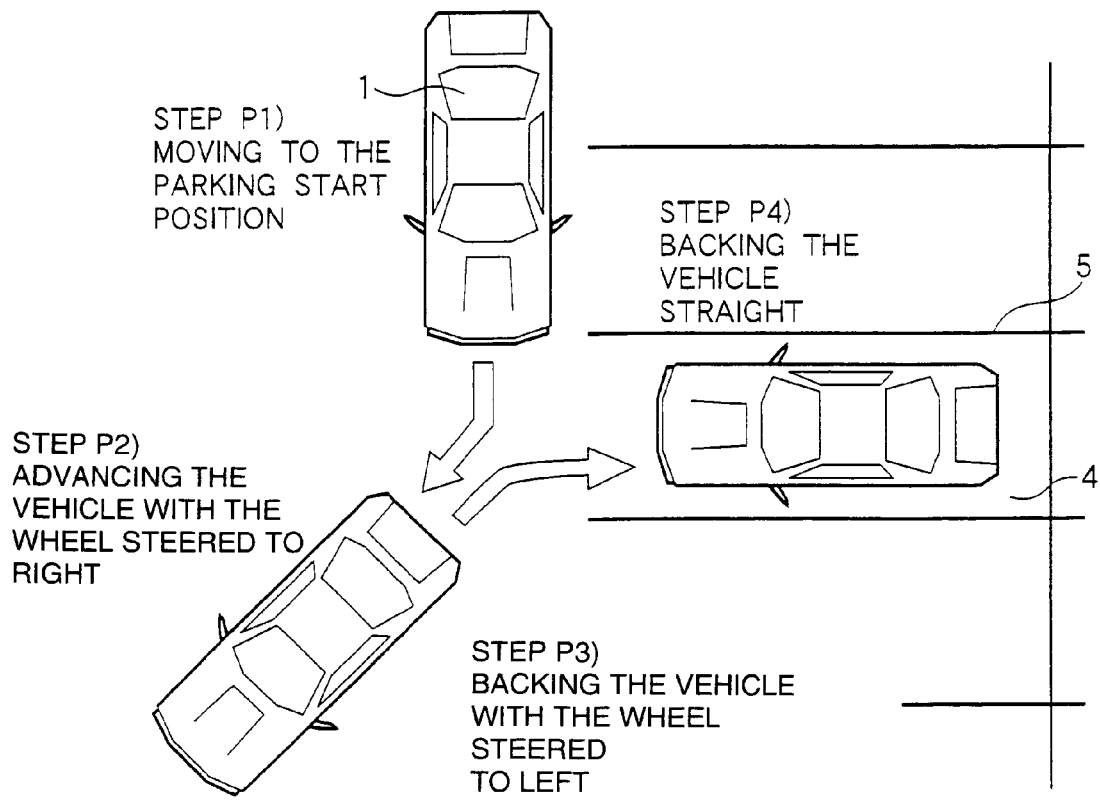
FIG. 39 explains the procedure of side-by-side parking typically performed by a large number of drivers.

As mentioned earlier, a general vehicle guidance method of side-by-side parking roughly follows four steps P1 to P4 (FIG. 39). A major characteristic of this method is to move the vehicle 1 to the parking start position of step P2 in FIG. 39. That is, the driver can check the parking space location directly with his/her eyes when backing the vehicle for parking. The parking start position is slanted away from the parking space 4 in order to shoot the entire parking space with vehicle-mounted cameras as well as facilitate wheel operation. Backing the vehicle with the wheel steered brings the vehicle straight into the center of the parking space 4.

FIG. 5A is a schematic view showing the state of the vehicle position of the step P2. FIG. 5B is a schematic view showing the parking start position to park the vehicle while turning the vehicle by 90 degrees at once. As understood from comparison of both figures, the parking start position is closer to the parking space 4 in FIG. 5A than in FIG. 5B. The camera captures a wider view of the parking space 4 in FIG. 5A. In FIG. 5A, there is no possibility that most of the area 4a of the parking space 4 is concealed by an adjacent vehicle from a camera unlike in FIG. 5B.

Thus, in this embodiment, a guide to accurately position the vehicle 1 in the state in FIG. 5A (step P2 in FIG. 39) is superimposed on the screen, in order to assist general vehicle guidance in side-by-side parking. Guide line according to this embodiment will be detailed.

Figure 6:
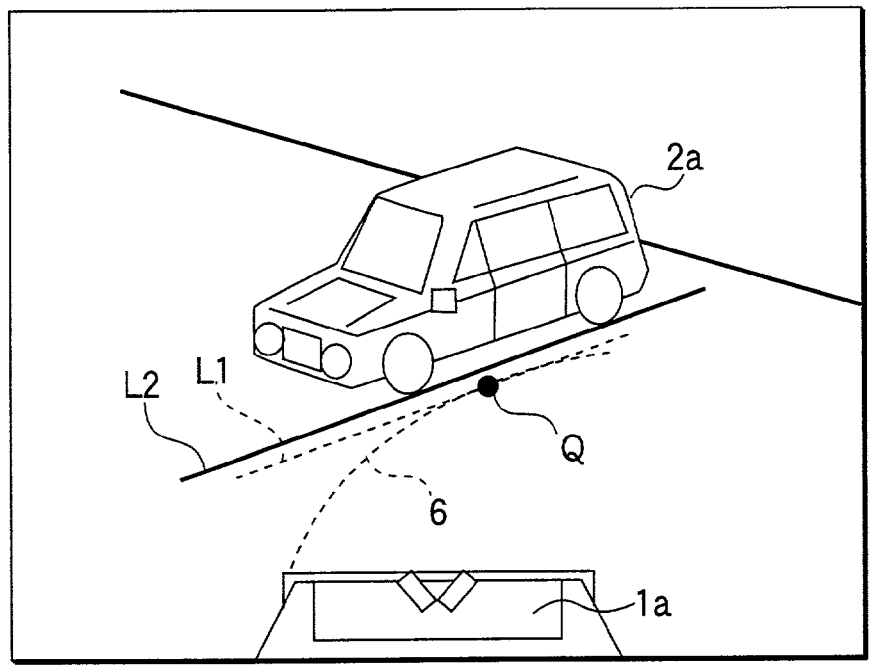
FIG. 6 explains a guide line L2 according to the first embodiment of the invention.

FIG. 6 explains the first embodiment of guide lines. A straight line (segment) drawn on the road surface at a predetermined spacing in parallel with a tangent line L1 of the predicted travel locus 6 in the maximum steering angle is assumed as a first guide line L2 in this embodiment. FIG. 6 shows the relation between the predicted travel locus 6 of the vehicle, its tangent line L1, and the first guide line L2.

The reason why the line occurs at a required spacing from the tangent line L1 of the predicted travel locus 6 is described below. A vehicle is moved so that the guide line L2 will coincide with the parking border line of the adjacent vehicle. Then, while the vehicle is backed with the steering angle at the maximum, said required spacing remains as a gap between the vehicle and the adjacent vehicle 2 in the parking space 4 where the vehicle 1 is to be parked. This avoids contact with the adjacent vehicle 2. Thus, the spacing between the tangent line L1 and the guide line L2 may be a spacing between the vehicle to park and the adjacent vehicle. This spacing is based on the real road surface so that said required spacing on the screen is adjusted to the screen display.

Figure 40A:
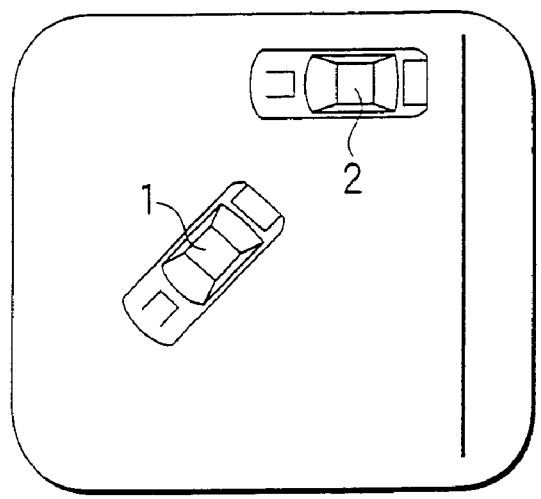
FIG. 40A is a schematic view showing the state where the vehicle is brought near another vehicle by applying the related art.
Figure 40B:
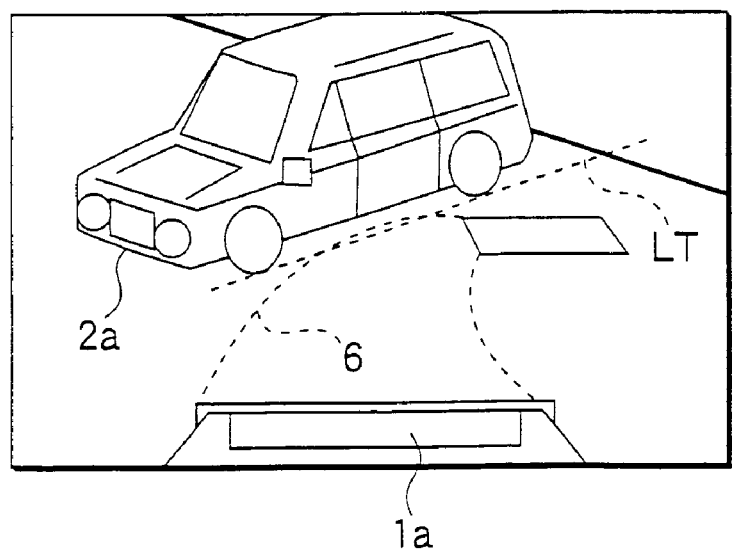
FIG. 40B shows the monitor screen in the state of FIG. 40A.

In case a vehicle is to be parked, a parking border line 5 is useful. Once the vehicle 1 is aligned so that the guide line L2 will coincide with the parking border line 5 using the parking border line 5 as a target, backing the vehicle 1 with the steering angle at the maximum parks the vehicle 1 in the center of the parking space 4. There may be a case where the parking border line 5 is unavailable. In such a case, a line (line LT in FIG. 40B) connecting the ground points of the front and rear tires of the vehicle parked in space adjacent to the parking space 4 is used as a target. The vehicle is guided so that the guide line L2 will coincide with the target then the vehicle is backed with the steering angle at the maximum. This safely parks the vehicle in the parking space 4.

The target that the first guide line L2 should coincide with is hereinafter referred to as "Target A."

Figure 7:
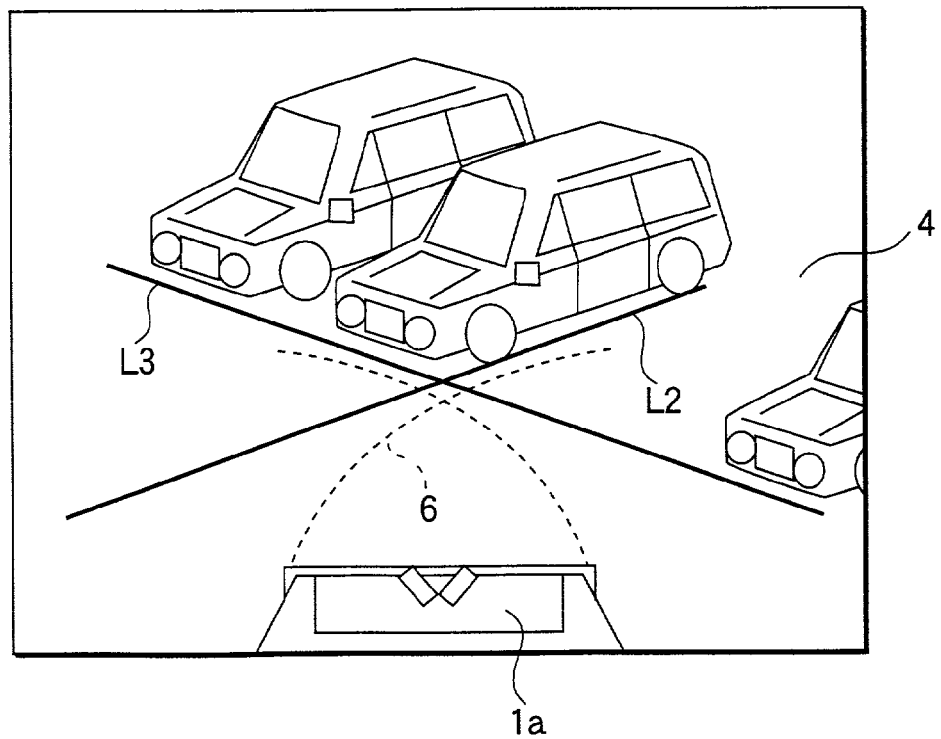
FIG. 7 explains an auxiliary guide line L3 according to the second embodiment of the invention.

In a second embodiment, a straight line (segment) crossing the first guide line L2 on the road surface, an orthogonal straight line (segment) in this example is assumed as the second guide (auxiliary guide) L3. When the overlapping of the first guide line L2 and the target is not clear on the screen, the second guide line L3 can be used as an auxiliary alignment tool. This also enhances the alignment accuracy of the parking start position. FIG. 7 is a schematic diagram showing the predicted travel locus 6 of the vehicle, the first guide line L2 and the second guide line L3.

By determining whether a target that forms a predetermined angle (typically perpendicular) with Target A (hereinafter referred to as "TargetB") on the road surface is in a predetermined geometric relation with the guide line L3 (typically parallel), coincidence of the guide line L2 with Target A is determined.

For example, as shown in FIG. 7, assuming that said predetermined angle is "perpendicular" and said geometric relation is "parallel," and Target B as a segment connecting the front ends of other vehicles 2 present near the parking space 4 into which the vehicle 1 will be driven, in case Target B is not parallel to the guide line L3, it is understood before starting parking procedure that the guide line L2 does not coincide with Target A. This prevents failure in parking.

Figure 8A:
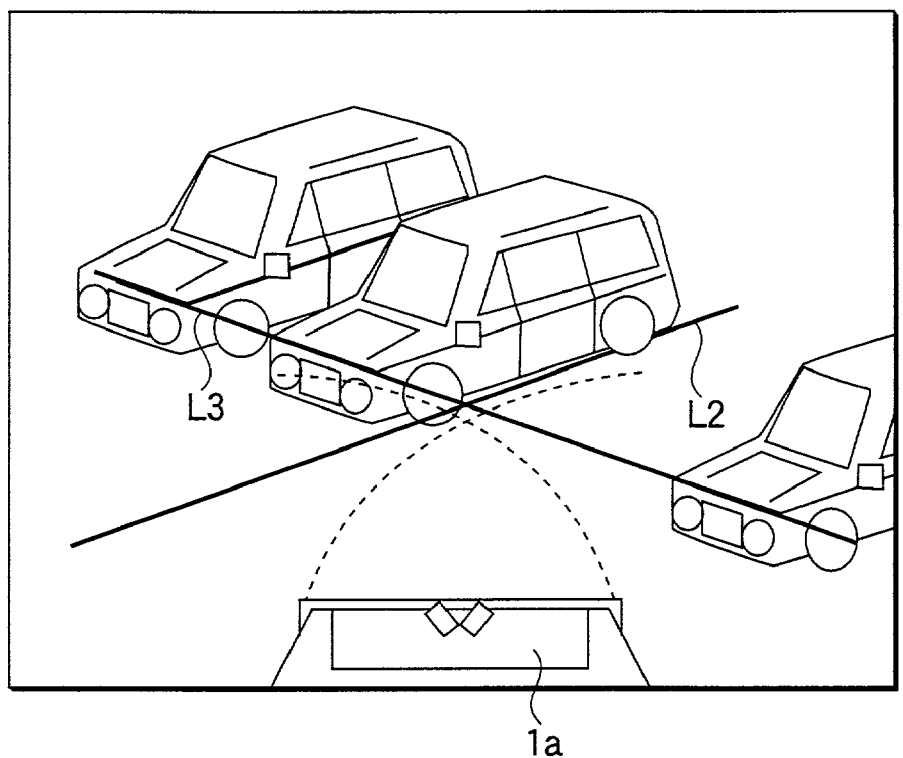
FIG. 8A shows the auxiliary guide line superimposed on an image of a parked vehicle according to the second embodiment of the invention.
Figure 8B:
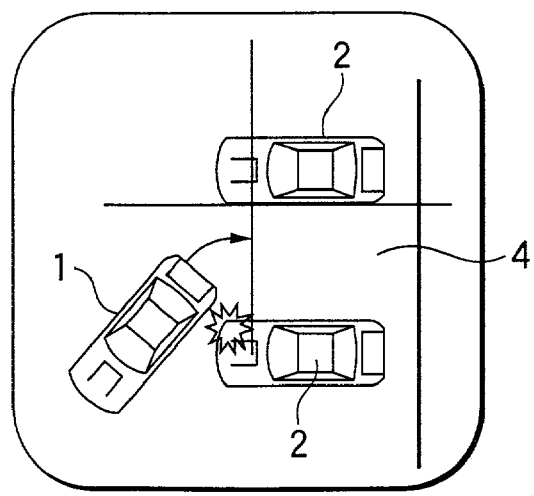
FIG. 8B is a schematic view according to the second embodiment of the invention showing the relation between the vehicle and another vehicle in the screen display of FIG. 8A.

The guide line L3 is also used as a guide for determining whether the vehicle 1 will contact a nearby vehicle before the space where the vehicle 1 is to be parked. For example, FIG. 8A shows a case where the guide line L3 coincides with the vehicles adjacent to the vehicle parking space. In this state, the vehicle 2 is closer than Target B as shown in FIG. 8B. Backing the vehicle 1 with the wheel at the maximum steering angle, contact with the vehicle 2 before reaching the vehicle parking space 4 cannot be avoided. By guiding the vehicle 1 so that the segment connecting the front ends of the vehicles 2 adjacent to the vehicle space 4 will not be exceeded, it is possible to determine whether the vehicle 1 will come into contact with the vehicle 2 before reaching the vehicle parking space 4.

When parking assistance apparatus is manufactured, it is necessary to consider which point on the predicted tire locus (point Q on the predicted locus 6 in FIG. 6) the guide L1 for creating the guide line L2 will contact. In other words, what angle should be formed by the vehicle in the state of step P2 in FIG. 39 and the parking space is the question. The guide shown on the monitor screen must be simple enough as a principle in order to avoid misunderstanding on the part of the driver.

Figure 9A:
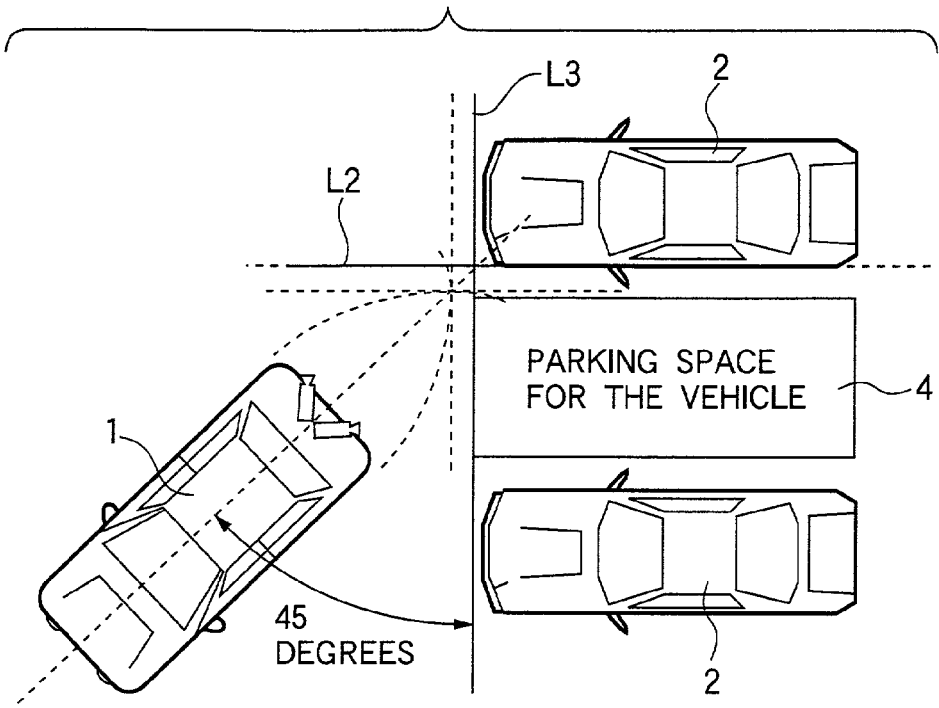
FIG. 9A is a schematic view according to the second embodiment of the invention showing the position of the vehicle when the vehicle is to be parked in a left-backward parking space.
Figure 9B:
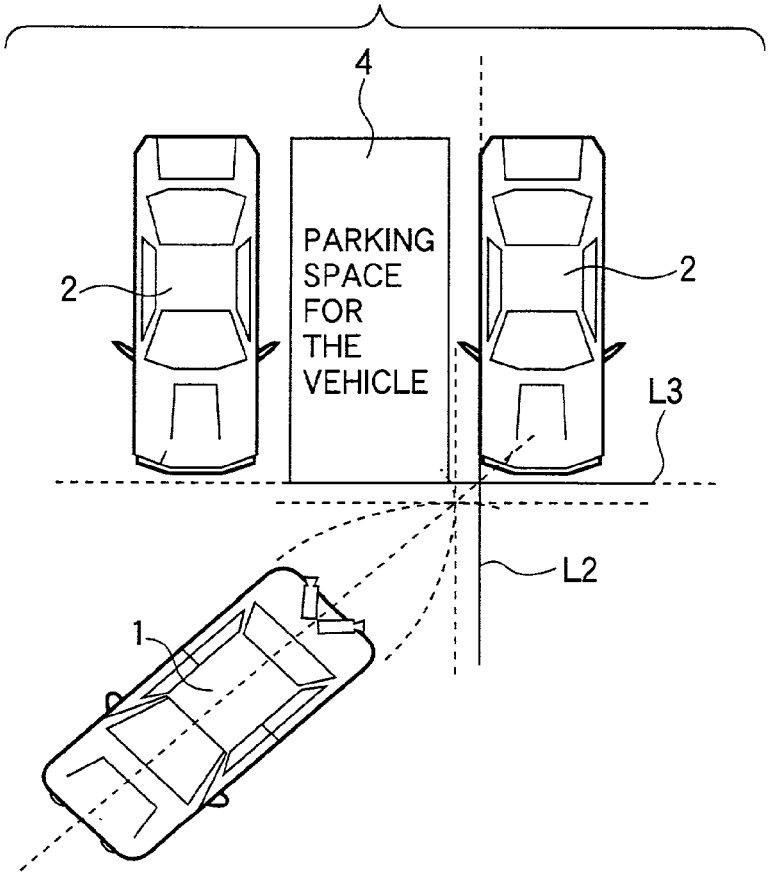
FIG. 9B is a schematic view according to the second embodiment of the invention showing the position of the vehicle when the vehicle is to be parked in a right-backward parking space.

With respect to these considerations, it is ideal to form the guide line L2 and the guide line L3 so that the guide line L2 will coincide with Target A and the guide line L3 will coincide with Target B when said "angle formed by the vehicle with the parking space" is 45 degrees. FIGS. 9A and B are conceptual diagrams showing the situation where the guide line L2 and guide line L3 coincide with Target A and Target B respectively when the vehicle and the parking space form an angle of 45 degrees. The reason why an angle of 45 degrees is ideal is that the same guide lines L2 and L3 can be used for either the case where parking is made in a left rear direction of the vehicle (FIG. 9A) or the case where parking is performed in a right rear direction of the vehicle (FIG. 9B), which simplifies the guide lines L2 and L3. That is, the roles of the guide lines L2 and L3 for the case where parking is performed in a left rear direction of the vehicle are opposite to those in the case where parking is performed in a right rear direction of the vehicle.

Ideal guide may not be feasible depending on the size of a vehicle. In such a case, it is desirable that an optimum angle is individually obtained as said angle and separate guides are used for left-backward parking and right-backward parking. This embodiment will be described later referring to FIG. 28.

Figure 10:
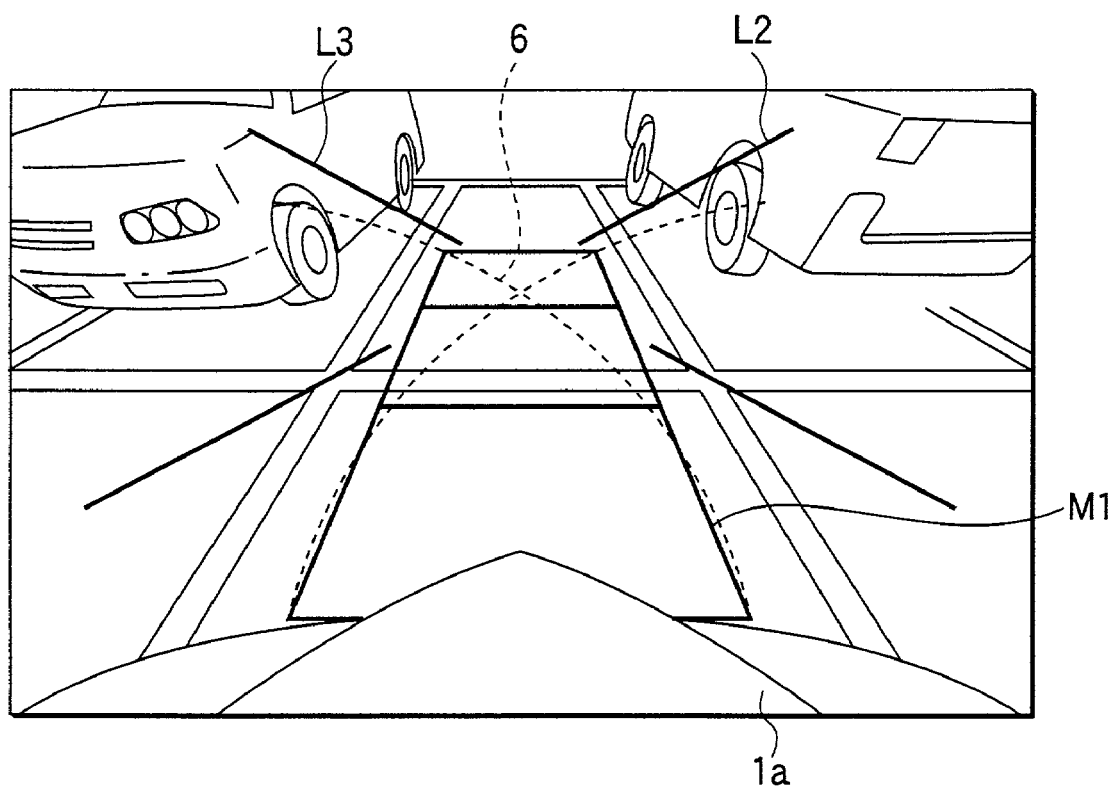
FIG. 10 shows guides superimposed on the monitor screen according to the second embodiment of the invention.

FIG. 10 shows an example where the guides that are based on said guide lines L2 and L3 are superimposed on a picked up image from the camera (actually a synthesized image with lens distortion removed). The guide lines L2 and L3 play opposite roles for left-backward parking and right-backward parking as mentioned earlier, the guide lines L2 and L3 are not discriminated from each other in FIG. 10. In the example of FIG. 10, a guide M1 for straight-backward parking and a predicted travel locus 6 at the maximum steering angle are drawn as well as the guide lines L2 and L3.

In this embodiment, by superimposing the guide lines L2 and L3 on the picked up image as well as superimposing a predicted travel locus at the maximum steering angle, it is made easy to determine the wheel turn back timing and the parking start position even when a costly steering angle sensor is not mounted on a vehicle or when the driver is not skilled. It is practically sufficient to superimpose only the guide lines L2 and L3 according to the embodiment on the monitor screen.

Next, the side-by-side parking using the guide lines L2 and L3 will be described. In the following description, steps P1, P2, P3 and P4 correspond to four steps of side-by-side parking shown in FIG. 39, unless otherwise specified.

Figure 11:
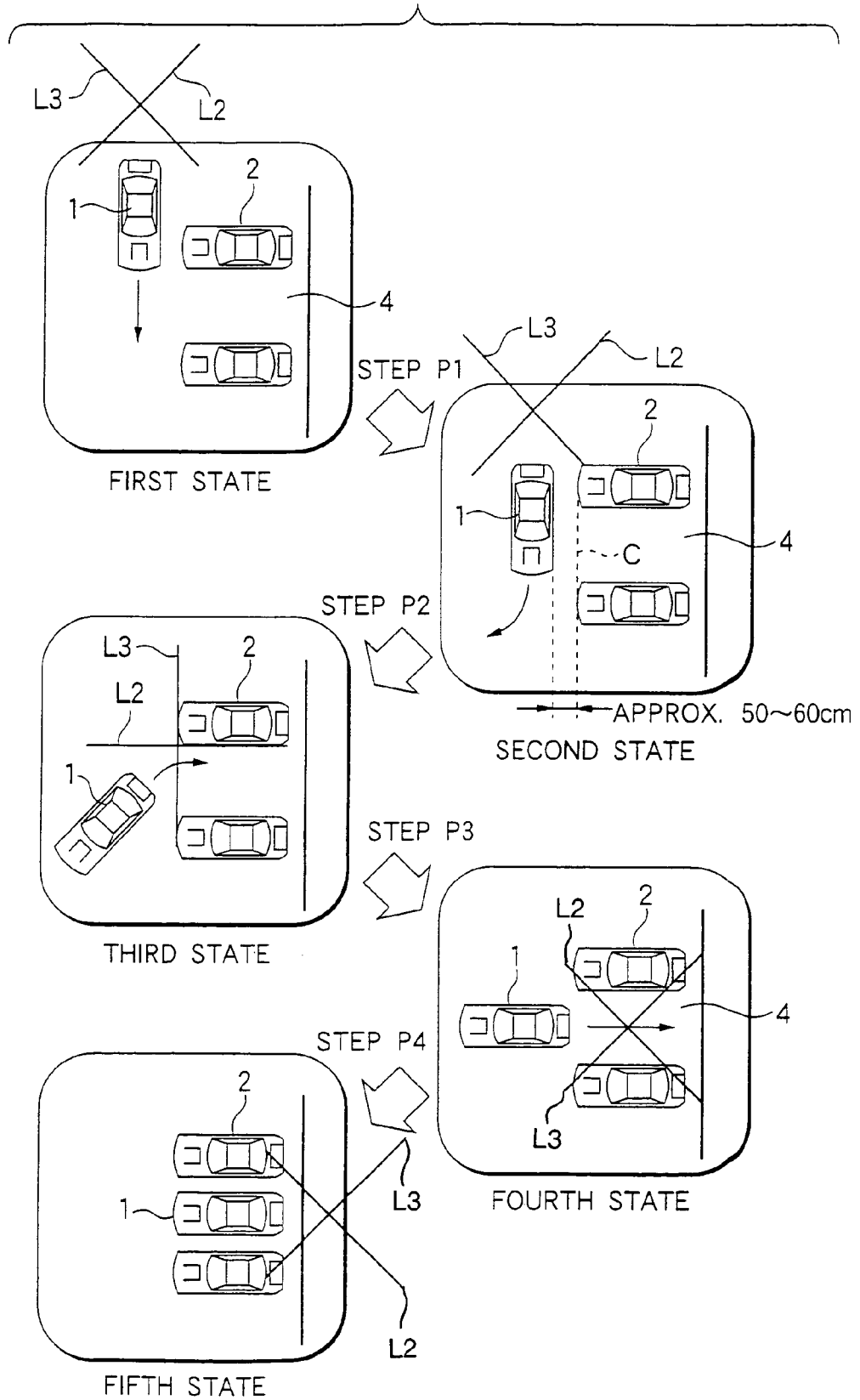
FIG. 11 is a schematic view according to the second embodiment of the invention showing the relation between the position of the vehicle and the position of another vehicle in accordance with the side-by-side parking procedure.
Figure 12:
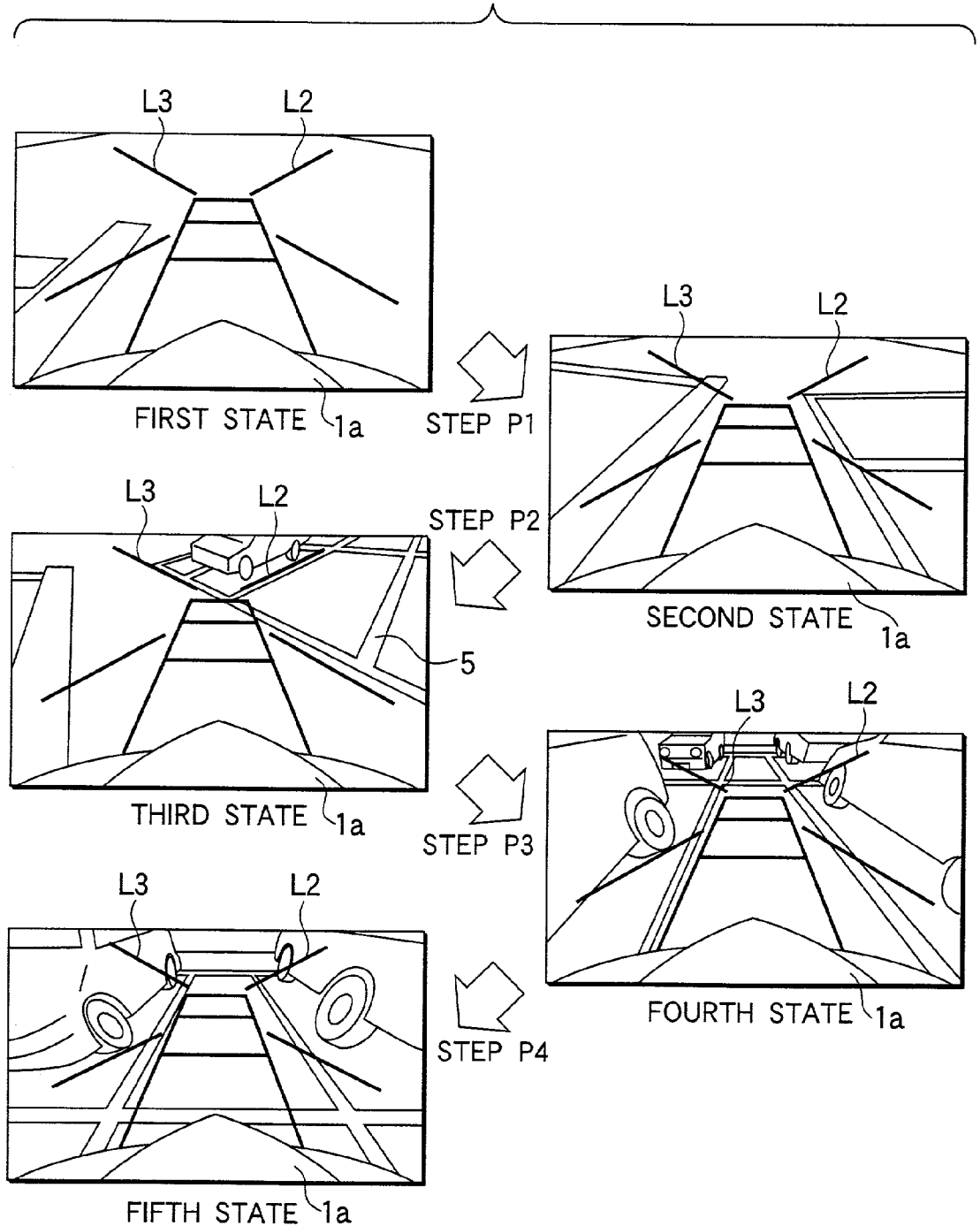
FIG. 12 shows the state of a monitor screen corresponding to each state in FIG. 11.

FIGS. 11 and 12 show a case where an ideal side-by-side parking without inefficient operation is performed. States before and after each of the steps P1 through P4 are linked by arrows to show the parking sequence from start of parking to end of parking. FIG. 11 is a schematic view showing how the relation between the vehicle 1 and its parking space 4 and the relation between the vehicle and the vehicles 2 adjacent to the parking space change when each step is followed. FIG. 12 shows the monitor screen corresponding to the situations before and after each step in FIG. 11.

What counts most in parking using the guide lines L2 and L3 is what criteria are used to determine that step P1 is complete. According to the experiment environment of the inventor, an empirical conclusion is that step P1 is complete when the vehicle 1 is separated from Line C connecting the front ends of the vehicles adjacent to the vehicle parking space 4 by approximately 50 to 60 centimeters and the driver's seat is in the center of the vehicle parking space 4.

Such criteria are very ambiguous so that it is practically impossible for a driver to park his/her vehicle in the same position in all cases. The guide lines L2, L3 in accordance with the embodiment allow any undesirable displacement of the end position of step P1 from the ideal position to be corrected by inserting a straight advancement or backing operation between steps P2 and P3 in the parking procedure, as shown by the third state in FIG. 13 and FIG. 15. This is detailed referring to two corresponding examples (FIGS. 13 and 14, FIGS. 15 and 16).

Figure 13:
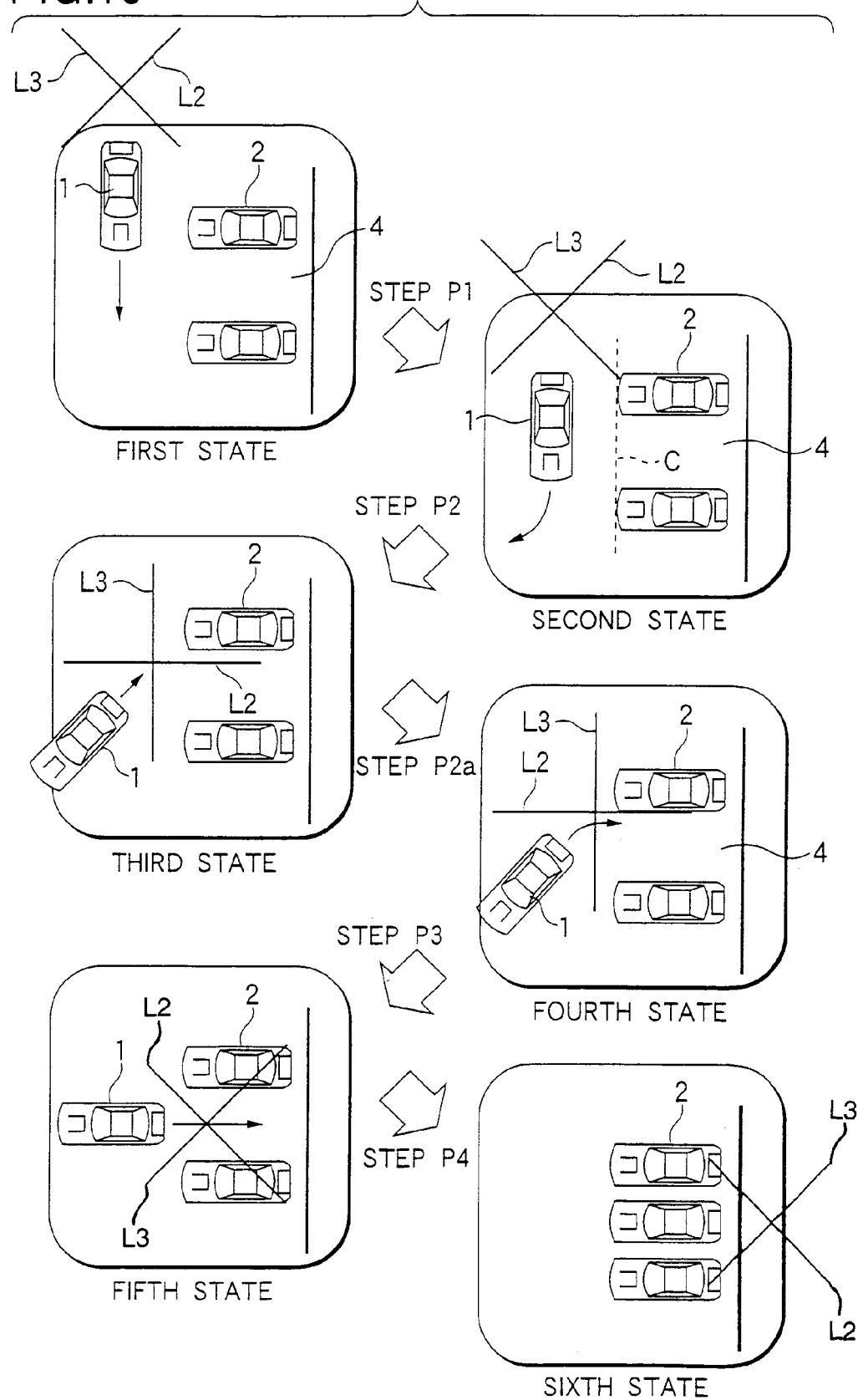
FIG. 13 is a schematic view according to the second embodiment of the invention showing the relation between the position of the vehicle and the position of another vehicle in accordance with the parking procedure used when the start position of side-by-side parking is too far away from another vehicle.
Figure 14:
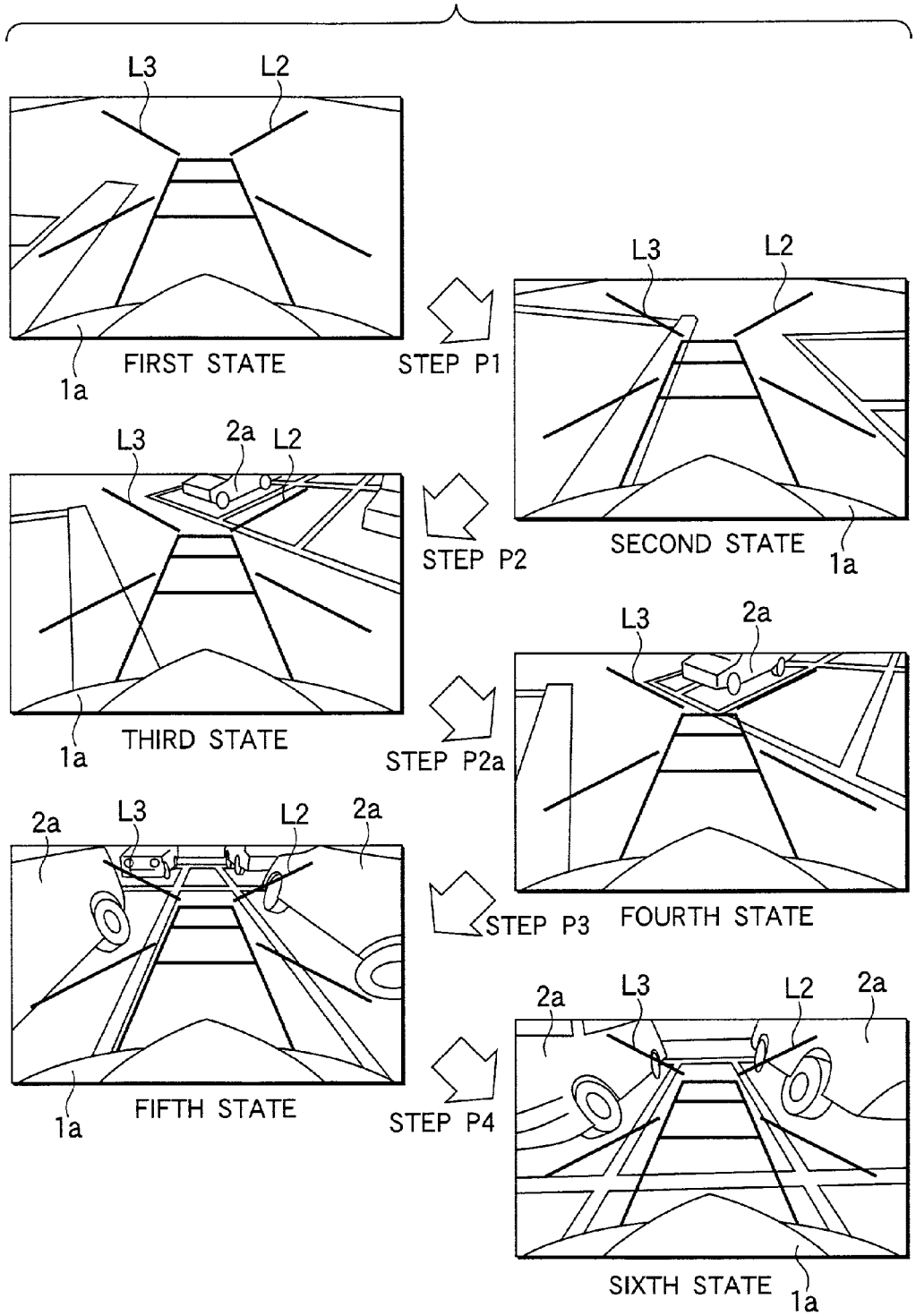
FIG. 14 shows the state of a monitor screen corresponding to each state in FIG. 13.

The first example is a case where the vehicle cannot be positioned in an ideal location in step P1 and the resulting distance between the vehicle 1 and said line C is too long. In this case, as shown in FIGS. 13 and 14, a straight backward step P2a is provided between steps P2 and P3 to correct the vehicle position. In this case, the steps for completing parking are (i) and (ii), as detailed below.

(i) Determination on End of Step P2

End of step P2 is determined by whether the vehicle 1 is slanted 45 degrees away from the parking space 4. As shown in the third state in FIG. 13, step P2 is assumed to be complete when the vehicle is guided so that the guide line L2 is parallel to Target A (a parking border line splitting the vehicle parking space and the adjacent parking space if any; otherwise a line connecting the ground points of the front and rear tires of the adjacent vehicle, and so on) and the guide line L3 is parallel to Target B (a line connecting the front ends of the adjacent vehicles in case the parking border line is absent; otherwise a line indicating the front end of the parking space, and so on; Line C is Target B in the example of FIG. 13), as shown in the third state of FIG. 13.

(ii) Determination on Start of Step P3

Start position of step P3 must be such that the vehicle is placed approximately in the center of the parking space 4 when the vehicle is backed with the wheel at the maximum steering angle to bring the vehicle 1 parallel to the orientation of the parking space 4. That is, the guide line L2 must coincide with Target A. Thus, as shown in the fourth state of FIG. 13, the driver returns the wheel straight and backs the vehicle once he/she has determined that step P2 is complete. Again, as shown in the fourth state of FIG. 13, the driver turns the wheel at the maximum steering angle when the guide line L2 has coincided with a line connecting the ground points of the front and rear tires of the adjacent vehicle.

The two steps (i) and (ii) are equivalent to step P2 in the ideal side-by-side parking in FIG. 39. Then, executing steps P3 and P4 completes parking.

Figure 15:
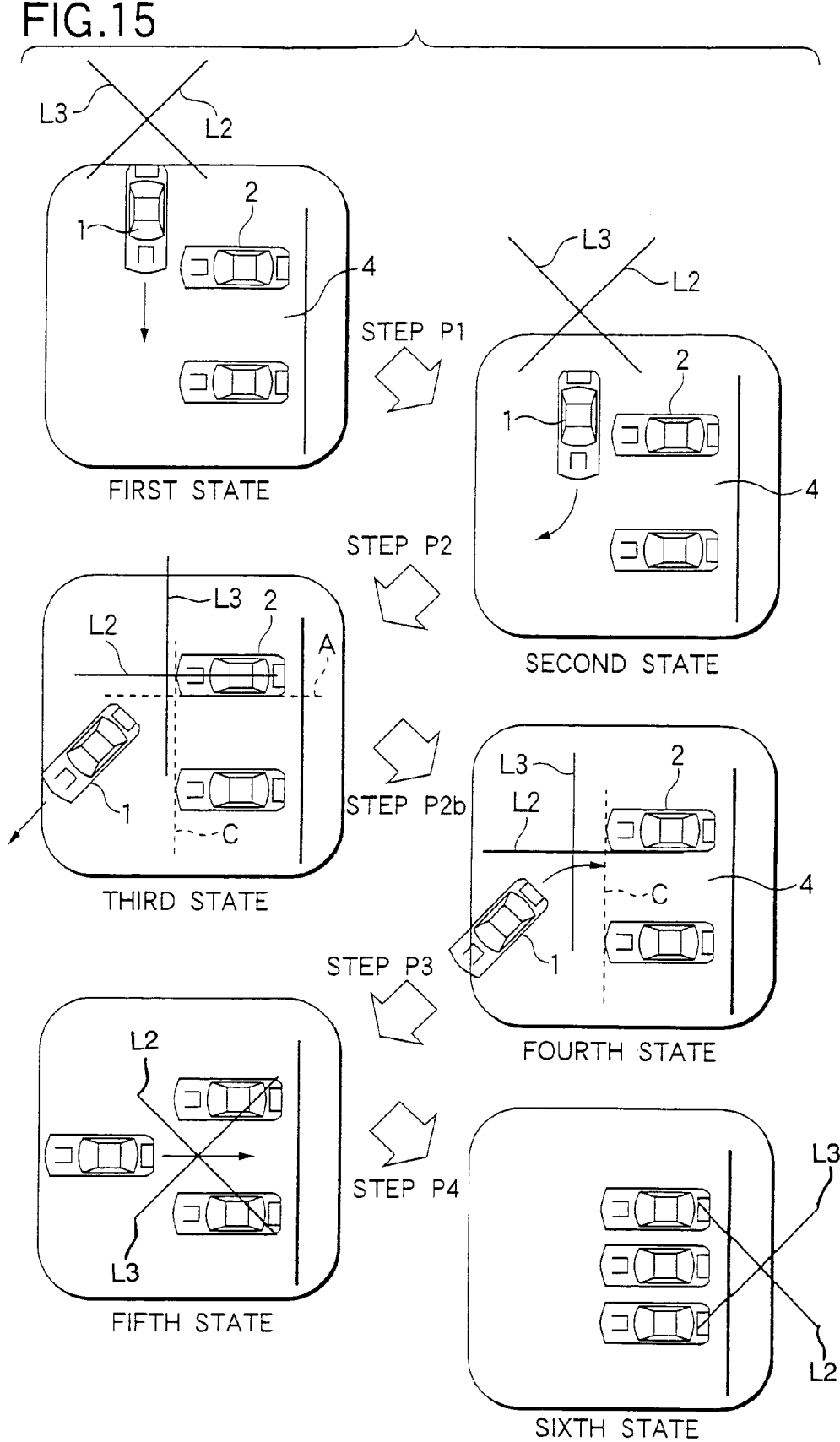
FIG. 15 is a schematic view according to the second embodiment of the invention showing the relation between the position of the vehicle and the position of another vehicle in accordance with the parking procedure used when the start position of side-by-side parking is too close to another vehicle.
Figure 16:
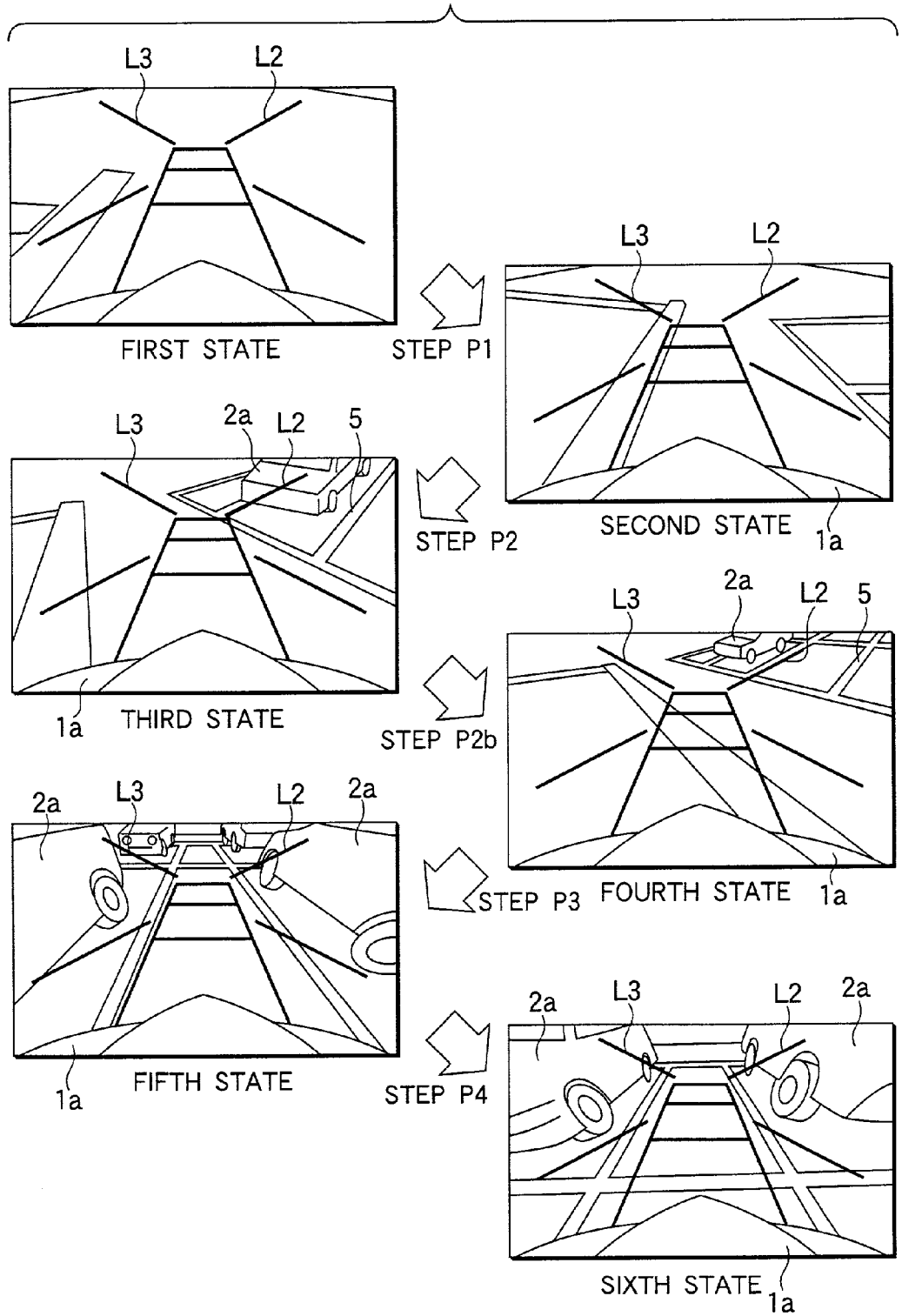
FIG. 16 shows the state of a monitor screen corresponding to each state in FIG. 15.

The second example is a case where the vehicle cannot be positioned in an ideal location in step P1 and the position of the vehicle is far before the ideal position (close to the adjacent vehicle before the parking space at the end of step P1). In this case, as shown in FIGS. 15 and 16, a straight forward step P2b is provided between steps P2 and P3 to correct the vehicle position. In this case also, the point for completing parking are (iii) and (iv) detailed below.

(iii) Determination of End of Step P2

End of step P2 is determined by whether the vehicle 1 is slanted 45 degrees away from the parking space 4. As shown in the third state in FIG. 15, step P2 is assumed to be complete when the vehicle is guided so that the guide line L2 is parallel to Target A and the guide line L3 is parallel to Target B (i this case Line C), as shown in the third state of FIG. 15.

(iv) Determination of Start of Step P3

Start position of step P3 must be such that the vehicle is placed approximately in the center of the parking space 4 when the vehicle is backed with the wheel at the maximum steering angle to bring the vehicle 1 parallel to the orientation of the parking space 4. That is, the guide line L2 must coincide with Target A. Thus, the driver returns the wheel straight and advances the vehicle once he/she has determined that step P2 is complete (the third state in FIG. 15), to cause the guide line L2 to coincide with Target A (the fourth state in FIG. 15). In this practice, it is necessary to take utmost care to check for any obstacle in the front direction of the vehicle 1 (advancing direction).

The two steps (iii) and (iv) are equivalent to step P2 in the ideal side-by-side parking in FIG. 39. Then, executing steps P3 and P4 completes parking. Next, the end-to-end parking using the guide lines L2 and L3 will be described. In the end-to-end parking also, the guide lines L2 and L3 are used for parking. In practice, a different target that a guide will be aligned with is used.

Figure 17:
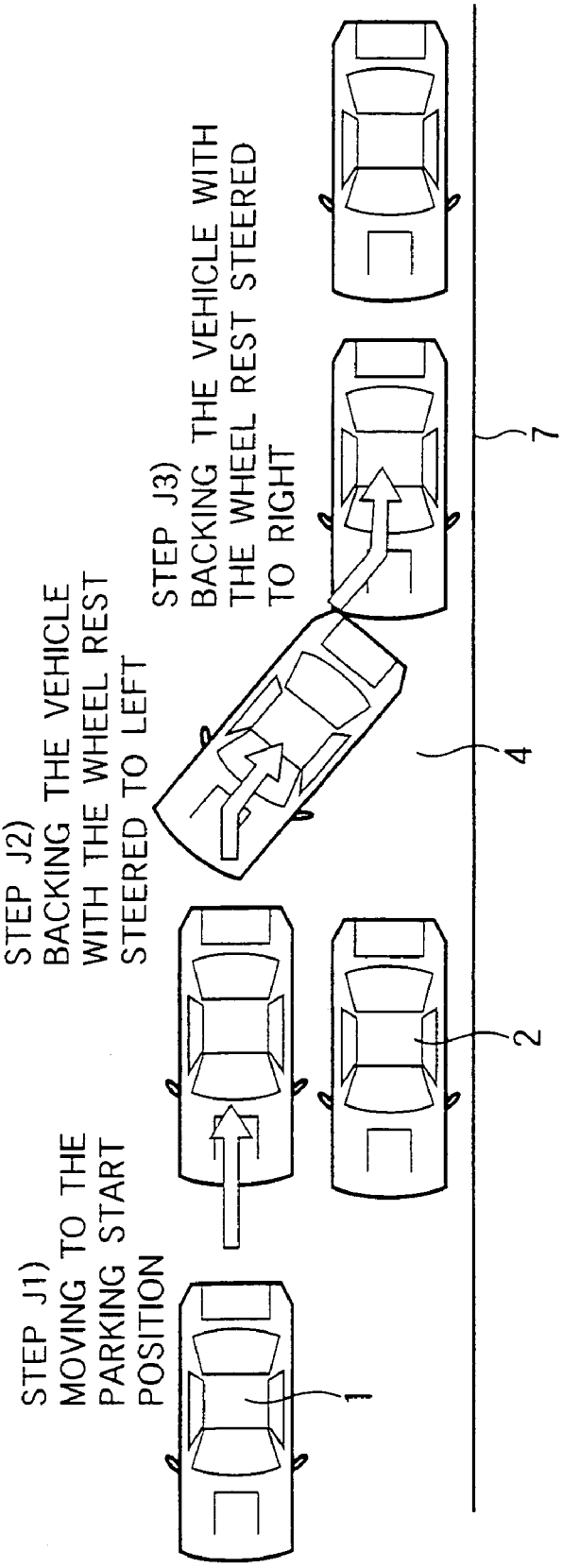
FIG. 17 explains the end-to-end parking procedure typically followed by a large number of drivers.

FIG. 17 explains the vehicle guidance method conventionally employed by a large number of drivers. For end-to-end parking, the driver guides the vehicle 1 in order to position the vehicle 1 side by side with another vehicle 2 parked before the parking space 4 (step J1), then the driver steers the wheel to left to bring the rear of the vehicle close to a curb 7 (step J2), then finally steers the wheel to right and backs the vehicle to bring the vehicle 1 in parallel with the curb 7 (step J3).

In the end-to-end parking, a reference line such as the curb 7 on the seat next to the driver at completion of end-to-end parking is used as a target for the guide line L3. In the following description, steps J1, J2, and J3 correspond to three steps of end-to-end parking shown in FIG. 17, unless otherwise specified.

Figure 18:
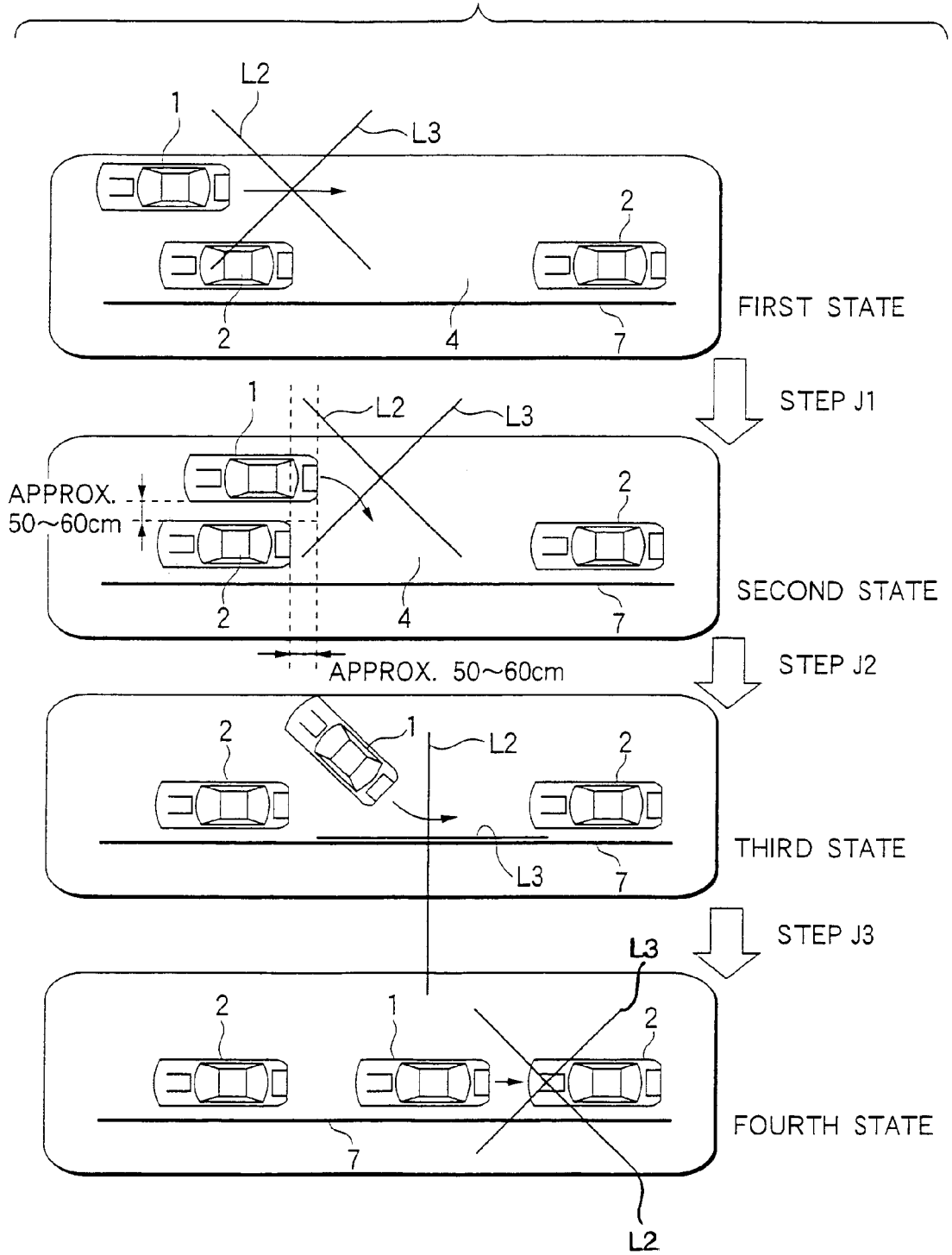
FIG. 18 is a schematic view according to the second embodiment of the invention showing the relation between the position of the vehicle and the position of another vehicle in accordance with the end-to-end parking.
Figure 19:
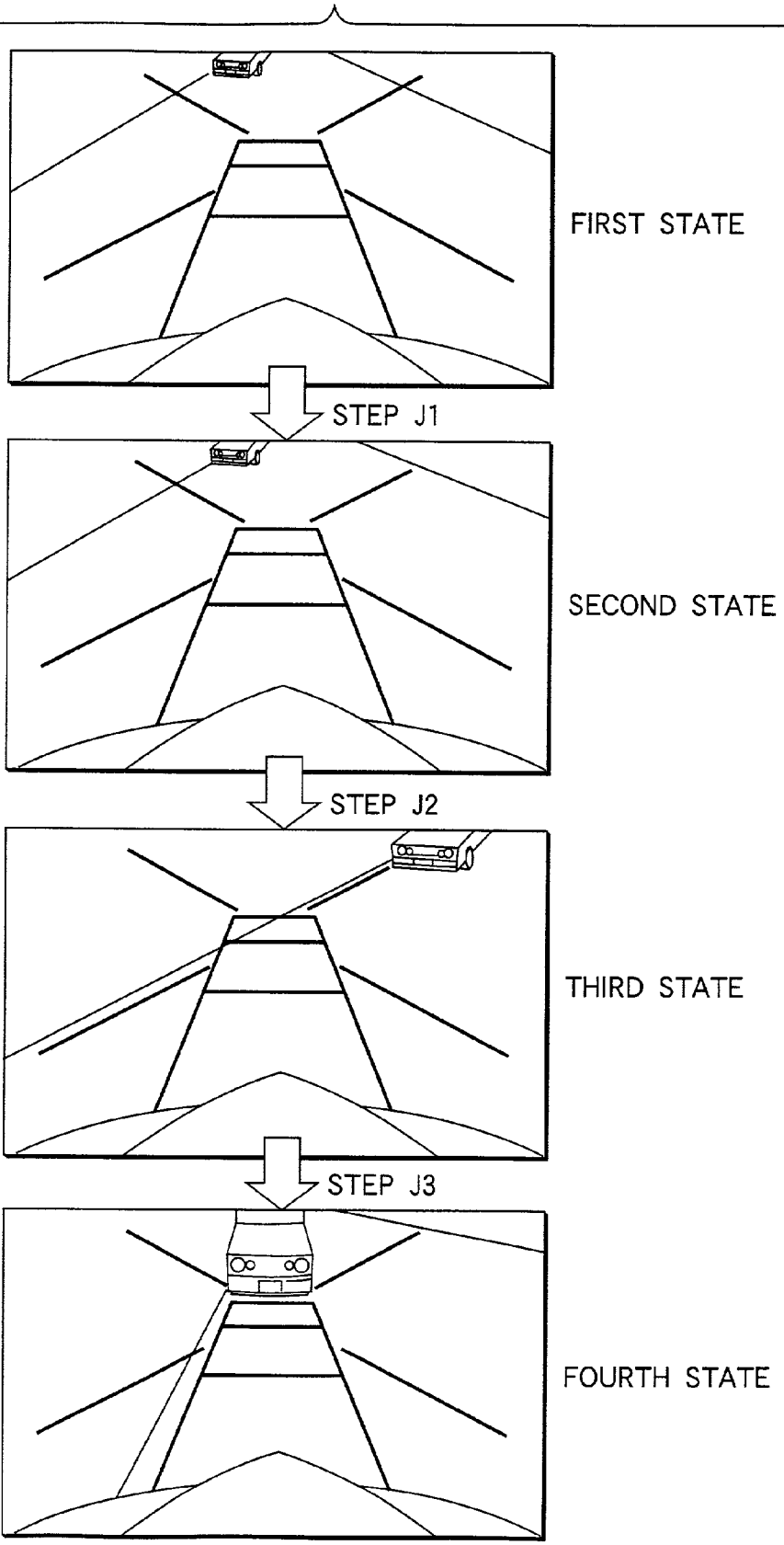
FIG. 19 shows the state of a monitor screen corresponding to each state in FIG. 18.

FIG. 18 shows a case where an ideal end-to-end parking without inefficient operation is performed. States before and after each of the steps J1 through J3 are linked by arrows to show the parking sequence from start of parking to end of parking. FIG. 18 is a schematic view showing how the relation between the vehicle 1 and its parking space 4 and the relation between the vehicle and the vehicles 2 adjacent to the parking space change when each step is followed. FIG. 19 shows the monitor screen corresponding to the situations before and after each step in FIG. 18.

What counts most in parking using the guide line L2 is what criteria are used to determine that step J1, J2 or J3 is complete. The method for determining end of each step will be described.

(a) Determination on End of Step J1

For the end of step J1, according to the experiment environment of the inventor, as shown in the second state in FIG. 18, an empirical conclusion is that the timing is when the vehicle 1 is apart from another vehicle 2 before the parking space 4 by approximately 50 to 60 centimeters and the rear end of the vehicle 1 is behind the rear end of the vehicle 2 before the parking space 4 by approximately 50 to 60 centimeters.

(b) Determination on End of Step J2

End of step J2 is determined by whether the guide line L3 matches the curb 7. In case an ideal end-to-end parking is performed, the guide line L3 coincides with the curb 7 when they have matched each other. The driver follows step J3 when such matching takes place, then backs the vehicle with the wheel steered to right to bring the vehicle 1 in parallel with the curb 7. This completes end-to-end parking.

The problem is that the criteria for completion of step J1 are very ambiguous. It is practically impossible for a driver to park his/her vehicle in the same position in all cases (second state in FIG. 18). Thus, in case the end position of step J1 is not ideal, the undesirable displacement must be corrected by the subsequent steps.

Figure 20:
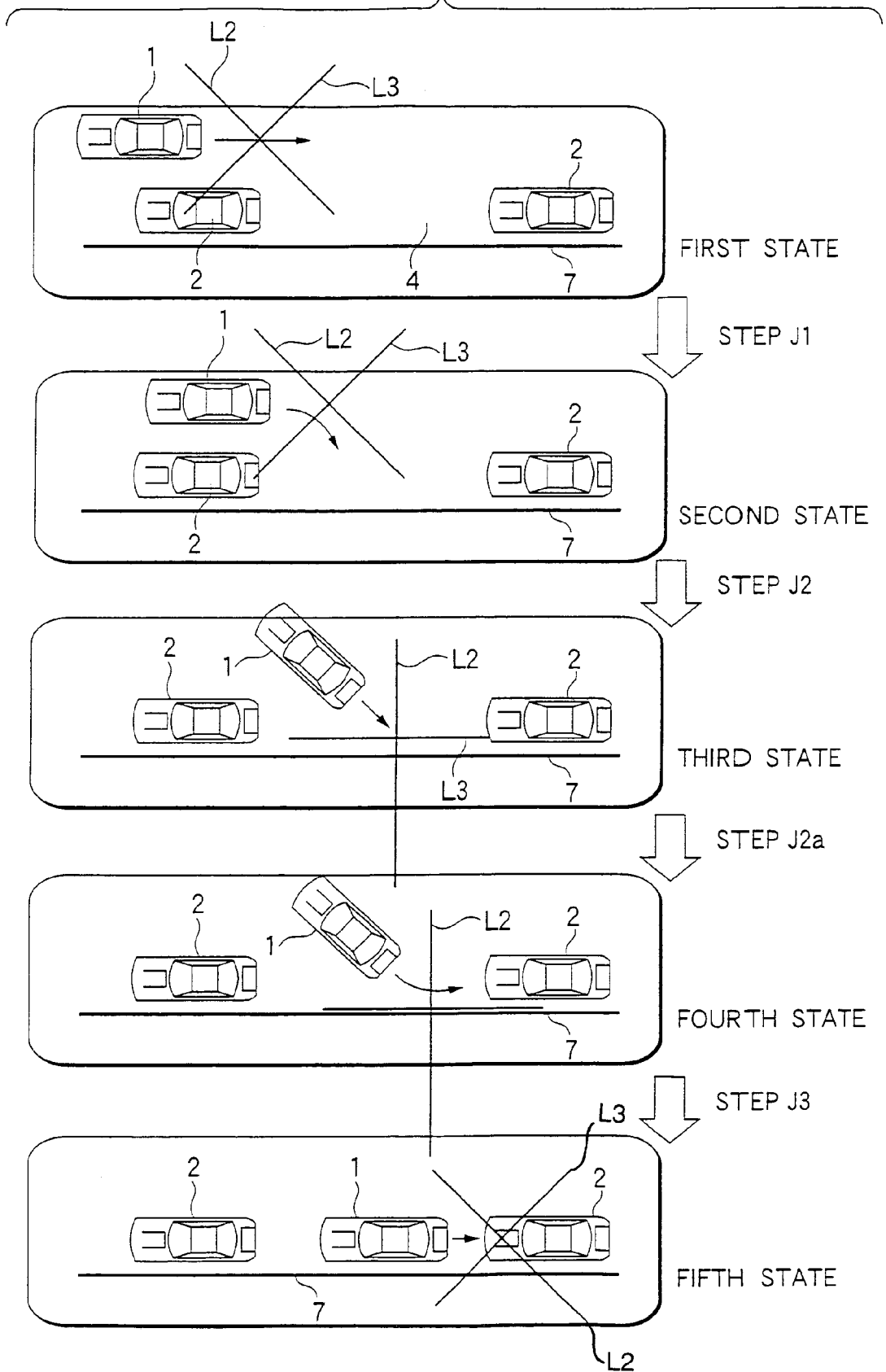
FIG. 20 is a schematic view according to the second embodiment of the invention showing the relation between the position of the vehicle and the position of another vehicle in accordance with the parking procedure used when the start position of end-to-end parking is too far away from another vehicle.

The guide lines L2, L3 in accordance with the embodiment allow any undesirable displacement of the end position of step J1 from the ideal position to be corrected thus ensuring the parking procedure. Its specific example will be described using FIG. 20. FIG. 20, same as FIG. 18, shows the end-to-end parking. FIG. 20 differs from FIG. 18 in that step J2*a* is added after step J2 in order to correct said undesirable displacement.

In this example, the spacing between the vehicle 1 at the end of step J1 and another vehicle 2 before the parking space 4 is more than the ideal spacing (approximately 50 to 60 centimeters). The driver cannot guide the vehicle 1 to satisfy the criteria for completion of said step J2 even in case he/she has steered the wheel at the end of step J1.

In this case, that is, in case the guide line L3 and the curb 7 are parallel but do not coincide with each other while the driver is backing the vehicle with the wheel steered, the driver aborts backing with the wheel steered. The driver turns back the wheel straight to back the vehicle straight until the guide line L3 coincides with the curb 7 (fourth state in FIG. 20) in next step J2*a*, then proceeds to next step J3.

Additional step J2*a* is equivalent to step J2 in the ideal end-to-end parking in FIG. 17. Then, executing step J3 completes end-to-end parking.

It has been proved that the guide lines L2 and L3 explained in FIG. 10 are effective in the side-by-side parking and end-to-end parking according to the aforementioned embodiments. Further, displaying simple guide marks provides the driver with a more effective tool. An embodiment concerning these guide marks will be described.

Figure 21:
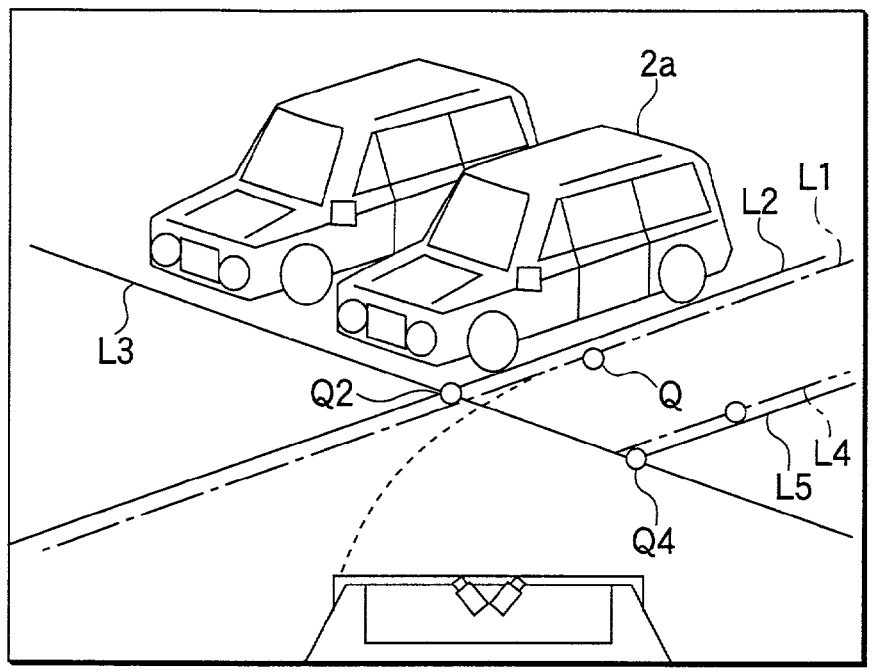
FIG. 21 explains guide marks according to the third embodiment of the invention.

FIG. 21 explains a guide according to the third embodiment of the invention. In this embodiment, guide marks Q2, Q4 are attached to guide lines L2, L3. In FIG. 21, the guide mark Q2 indicates the intersection of the guide line L3 and the guide line L2. The guide mark Q4 is the intersection of the straight line L5 apart from the same predetermined spacing as that between the tangent line L1 and the guide line L2 from the parallel line L4 apart from the tangent line L1 by the distance of vehicle width, and the guide line L3.

In this way, the guide mark is placed at a predetermined spacing from the line L4 tangent to the vehicle, same as the guide line L2 is placed apart from the tangent line L1, because said predetermined spacing provides a gap between the vehicle and an obstacle such as a vehicle on the left so that contact may be avoided without fail.

Figure 22:
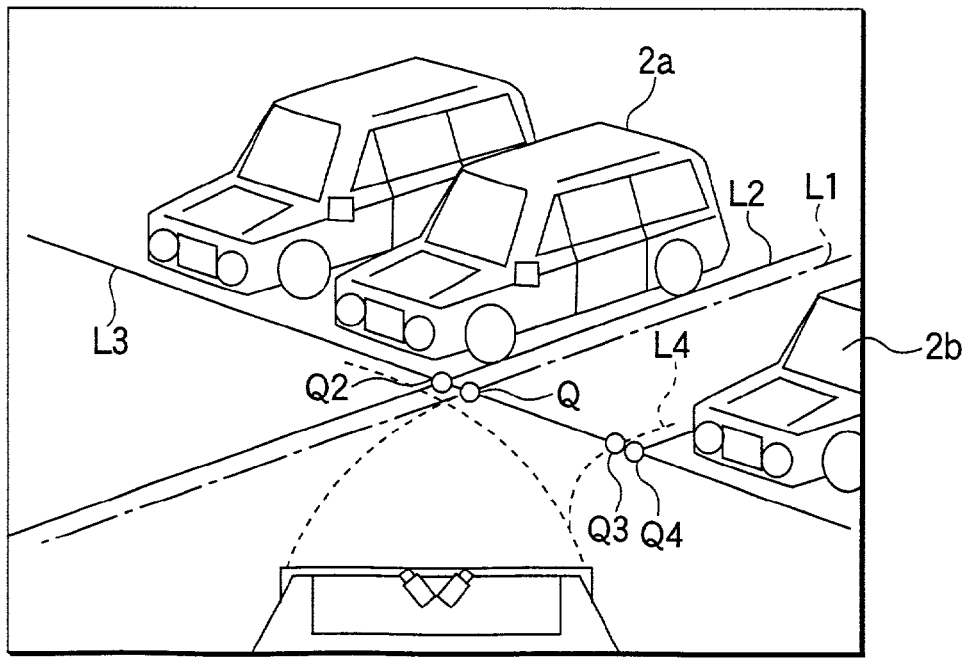
FIG. 22 explains guide marks according to the third embodiment of the invention.

In particular, as shown in FIG. 22, in case a point of contact Q of the predicted backing locus is on the guide line L3, the intersection Q3 of the line L4 and the guide line L3 suggests the interior of the predicted travel locus. Thus, the guide mark Q4 is drawn with a predetermined spacing margin inside the predicted travel locus. In other words, the segment Q2–Q4 displays a range that has a margin of a predetermined spacing on the right and left over the section (vehicle width range) the predicted travel section (section of segment Q-Q3) overlaps the guide line L3.

While details will be given later, when the driver parks a vehicle by using the guide mark Q2 and the guide mark Q4 as a guide, he/she can park the vehicle just in the center of the parking space by steering the vehicle so that both guide marks Q2, Q4 are between the right and left parking border lines when such lines are painted in the parking location, or between the right and left parked vehicles when such vehicles are present although the border lines are not painted.

The guide lines L2, L3 and the guide marks Q2, Q4 may be displayed so that the driver can view such guide lines or guide marks. While the guide lines Q2, Q4 are displayed as marks larger than the line width of the guide lines L2, L3, they need not be displayed as visible marks but replaced by section of segment Q2–Q4 in a different color, or only the segment Q2–Q4 may be hidden so that the guide marks Q2, Q4 can be identified by the driver.

Figure 23:
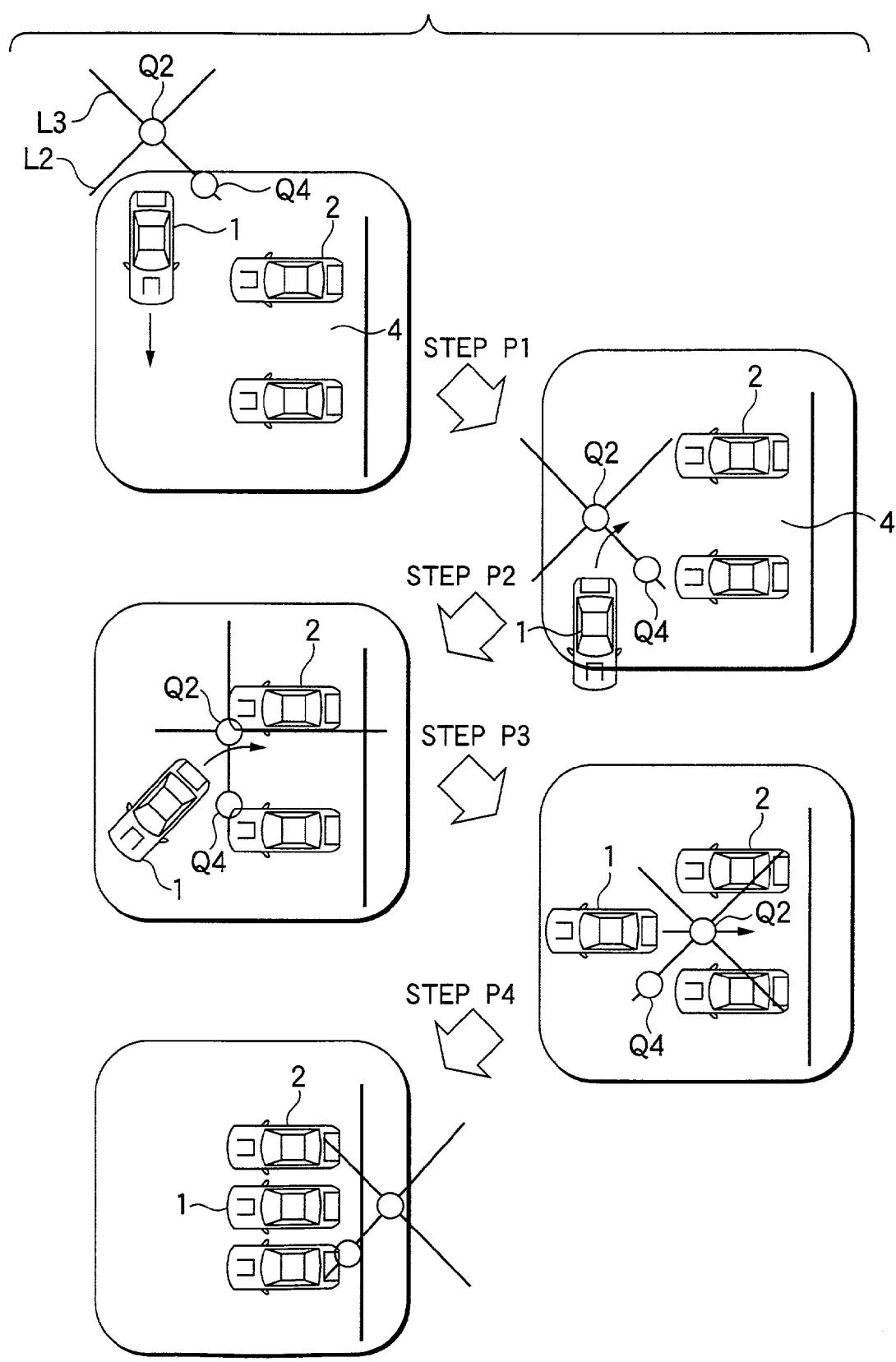
FIG. 23 is a schematic view showing the side-by-side parking procedure using guide marks according to the third embodiment of the invention.

FIG. 23 explains the side-by-side parking using the guide marks Q2, Q4. This embodiment is the same as the aforementioned side-by-side parking procedure in FIG. 11 (step P1, P2, P3, P4) but the determination on the start of step P3 is more secure in this embodiment.

In step P3, the driver starts backing the vehicle with the wheel at the maximum steering angle and completes step P3 when the vehicle 1 is in a straight position in the parking space 4. In case the driver fails to properly start step P3, he/she cannot park the vehicle 1 in the center of the parking space, but in a position off the center either rightward or leftward. To park a vehicle in the center of the parking space 4 by using the guide lines L2, L3 alone, some degree of skill is required.

It is possible to accurately determine the start position of step P3, by moving the vehicle 1 into the position where the guide lines Q2, Q4 are arranged uniformly between the adjacent vehicles (or between the parking border lines) when the guide lines Q2, Q4 of this embodiment are displayed and the guide line L3 is brought in parallel with Target B (line connecting the front ends of adjacent vehicles).

Figure 24:
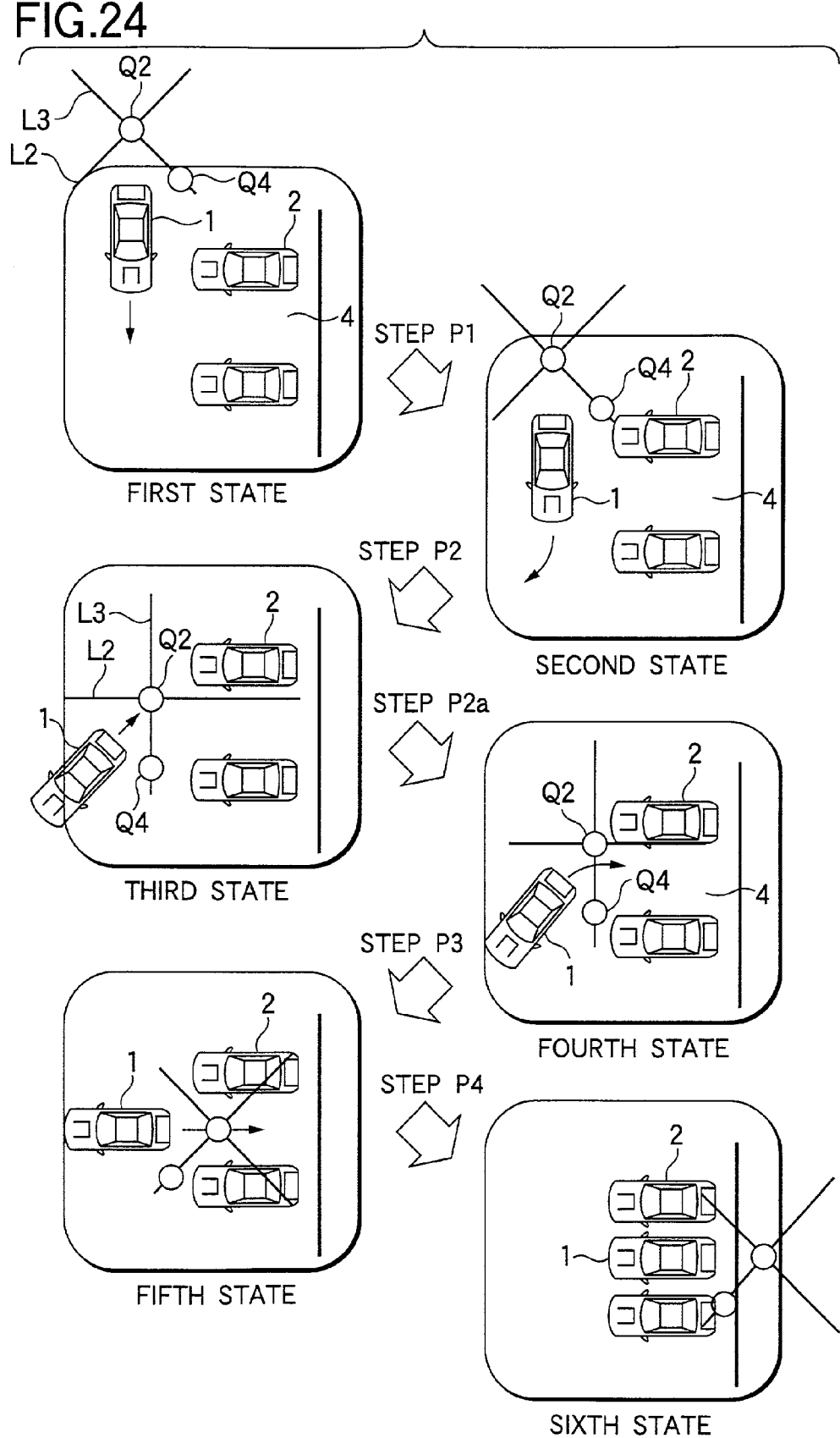
FIG. 24 is a schematic view showing the parking procedure used when the vehicle is too far beyond the ideal position in side-by-side parking that uses guide marks according to the third embodiment of the invention.

FIG. 24 is an explanatory drawing corresponding to the side-by-side parking described referring to FIG. 13. In case the vehicle has passed through the ideal position of step P1, the driver directly backs the vehicle in step P2*a*. While the guide lines L2 and L3 are used as a guide to determine the start position of step P3 in the embodiment of FIG. 13, guide marks Q2, Q4 can be referenced on top in this embodiment, thus allowing a higher-accuracy determination of the start position of step P3. This determination is made as mentioned in (v) below.

(v) Determination on Start of Step P3

Start position of step P3 must be such that the vehicle 1 is placed approximately in the center of the parking space 4 when the vehicle is backed with the wheel at the maximum steering angle to bring the vehicle 1 parallel to the orientation of the parking space 4. In the aforementioned determination on start of step P3 (iv), the guide is coincidence of the guide line L2 with Target A. On the other hand, the guide marks Q2, Q4 must be uniformly arranged by providing balanced distances from the adjacent vehicles. Thus, the driver turns back the wheel straight once he/she has determined completion of step P2, and backs the vehicle straight. The driver stops straight backing when the vehicle has entered the fourth state where the guide marks Q2, Q4 are uniformly arranged side by side in the parking space. The driver follows step P3 to start backing the vehicle with the wheel steered.

This step is equivalent to step P2 in the ideal side-by-side parking in FIG. 39, thus parking the vehicle in the center of the parking space.

Figure 25:
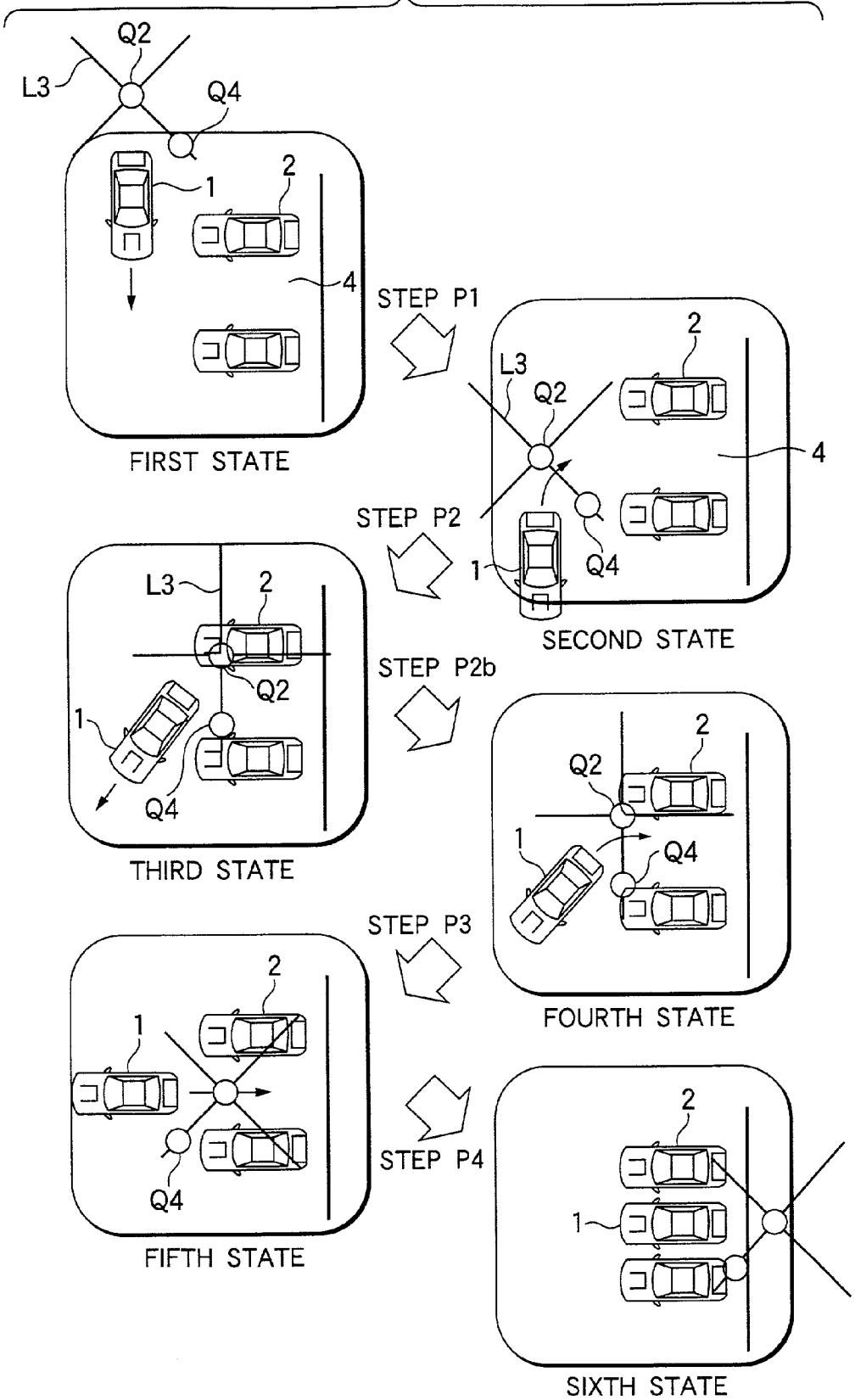
FIG. 25 is a schematic view showing the parking procedure used when the vehicle is too far before the ideal position in side-by-side parking that uses guide marks according to the third embodiment of the invention.

FIG. 25 shows a case where the end position of step P2 is before the ideal position, which corresponds to the aforementioned embodiment in FIG. 15, on the contrary to FIG. 24. In this embodiment, the driver, after the third state in FIG. 24, advances the vehicle straight in step P2b. In step P2b, the driver determines the start of step P2b same as the step P3 start determination of (v) and stops advancing the vehicle when the vehicle has entered the fourth state where the guide marks Q2, Q4 are uniformly arranged with respect to right/left spacing in the parking space 4. The driver then follows step P3 to park the vehicle in the center of the parking space.

Figure 26:
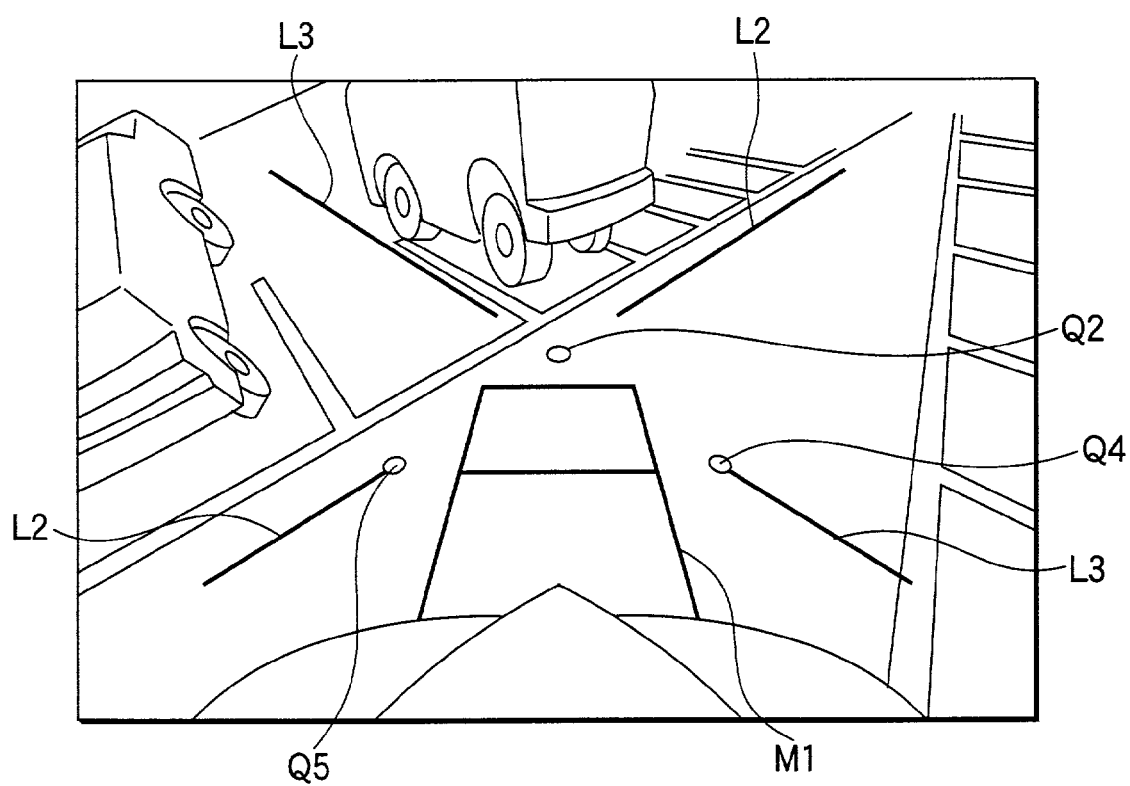
FIG. 26 explains guides according to the fourth embodiment of the invention.

FIG. 26 explains the guides according to the fourth embodiment of the invention. Guides used in FIG. 26 are a guide mark Q5 as well as the guide lines L2, L3 and the guide marks Q2, Q4 used in the second and third embodiments. The guide mark Q5 on the guide line L2 has a width with a predetermined spacing both rightward and leftward compared with the vehicle width, in the section Q2–Q5. The guide mark Q5 corresponds to Q4 on the guide line L3 and used when the vehicle is to be parked in the parking space in a rear left direction. The use method is the same as that for the guide mark Q4.

In the example of FIG. 26, the guide lines L2, L3 near the guide mark Q2 are hidden in order to provide a better view of the guide mark Q2. Guide lines L2, L3 are hidden in the guide mark sections Q2–Q4 and Q2–Q5. Three guide lines Q2, Q4, Q5 are displayed in different colors to assure easy identification.

Figure 27:
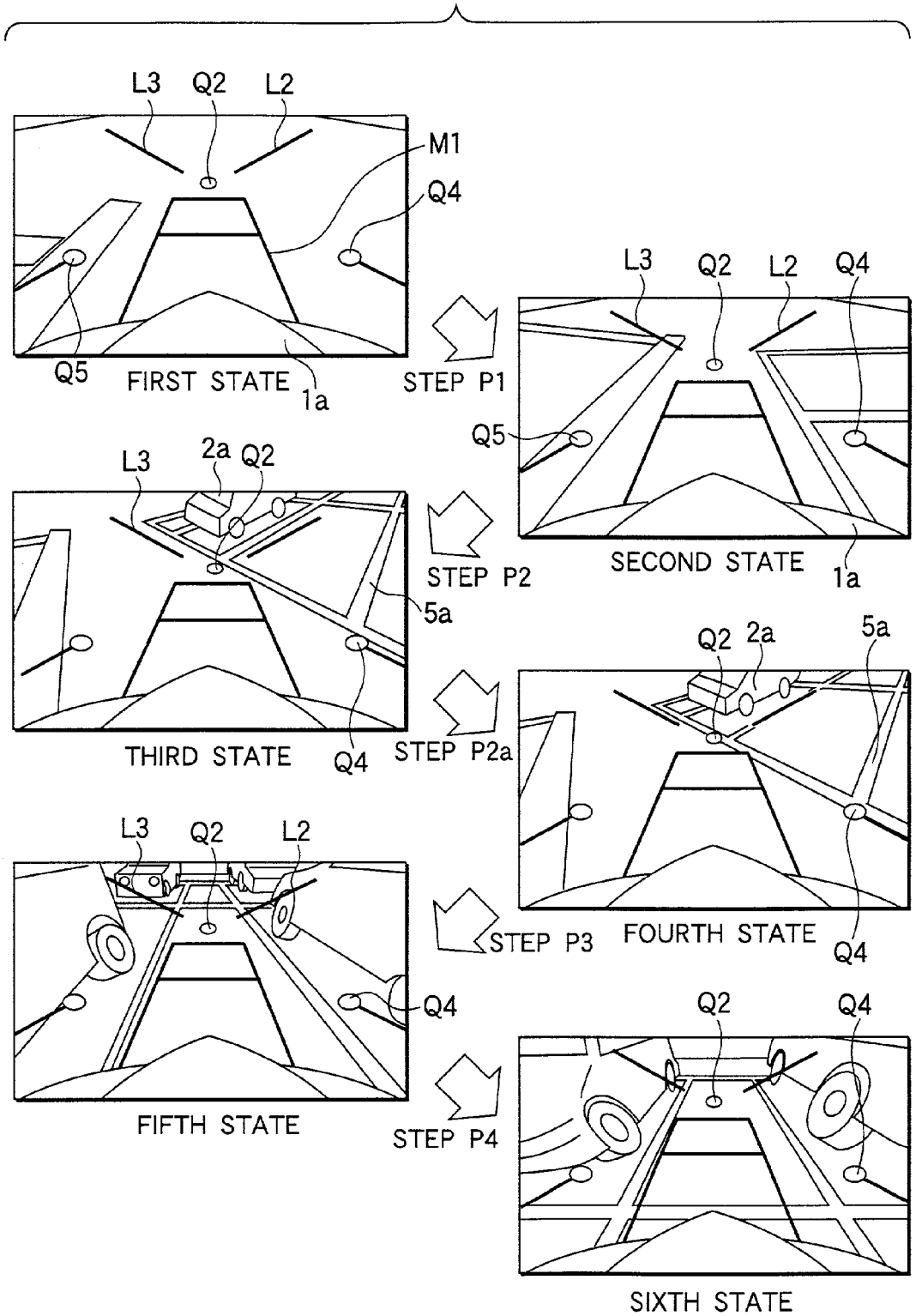
FIG. 27 shows transition of the monitor screen assumed when side-by-side parking is performed using guides according to the fourth embodiment.

FIG. 27 shows an example of transition of the actual monitor screen assumed when side-by-side parking is performed using guides according to the fourth embodiment. The monitor example of side-by-side parking is the same as the procedure for side-by-side parking in FIG. 24 (procedure used when the vehicle is far from the ideal position).

In the third state of the monitor screen in FIG. 27, the vehicle is undesirably displaced from the ideal position. This is because the guide mark Q4 is not on the product of the parking border line image 5a. Thus, step P2a is executed, that is, the driver backs the vehicle straight to place the vehicle in the fourth state of the monitor screen, that is, so that the guide mark Q4 will be on the extension of the parking border line image 5a.

In the example of FIG. 27, the spacing between the guide marks Q2 and Q4 is the same as the spacing between the adjacent parking border lines. In the fourth state, the guide mark Q2 is also on the extension of the parking border line image ahead. In case the spacing between the guide marks Q2 and Q4 is narrower than the spacing between the adjacent parking border lines, the driver backs the vehicle so that the guide marks Q2, Q4 are arranged equidistantly within the corresponding parking border line images. By positioning the vehicle in an ideal location (fourth state) then executing steps P3 and P4, the driver can parks the vehicle in the center of the parking space.

Figure 28:
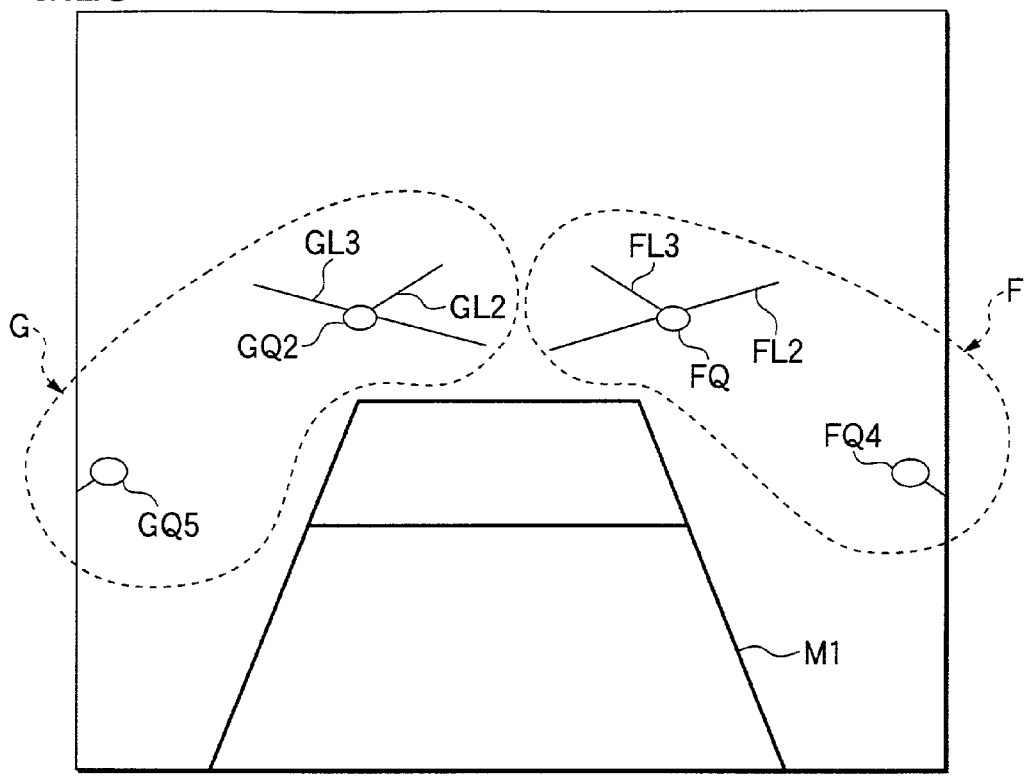
FIG. 28 explains guide marks according to the fifth embodiment of the invention.

While the guide lines L2 and L3 are slanted 45 degrees leftward and rightward respectively away from the center line of the vehicle, it is expected that the ideal guide lines L2, L3 cannot be used depending on the size and shape of a vehicle. In this case, it is desirable to individually obtain optimum angles as said angles and provide separate guides for rightward/leftward parking. FIG. 28 shows guides according to the fifth embodiment where separate guides for rightward/leftward parking are provided.

In the fifth embodiment of the invention shown in FIG. 28, the guide F for left-backward parking and the guide G for right-backward parking are separately provided. The guide F is composed of guide lines FL2, FL3 corresponding to the guide lines L2, L3 and guide marks FQ2, FQ4 corresponding to the guide marks Q2, Q4. The guide G is composed of guide lines GL2, GL3 corresponding to the guide lines L2, L3 and guide marks GQ2, GQ5 corresponding to the guide marks Q2, Q5.

Figure 29:
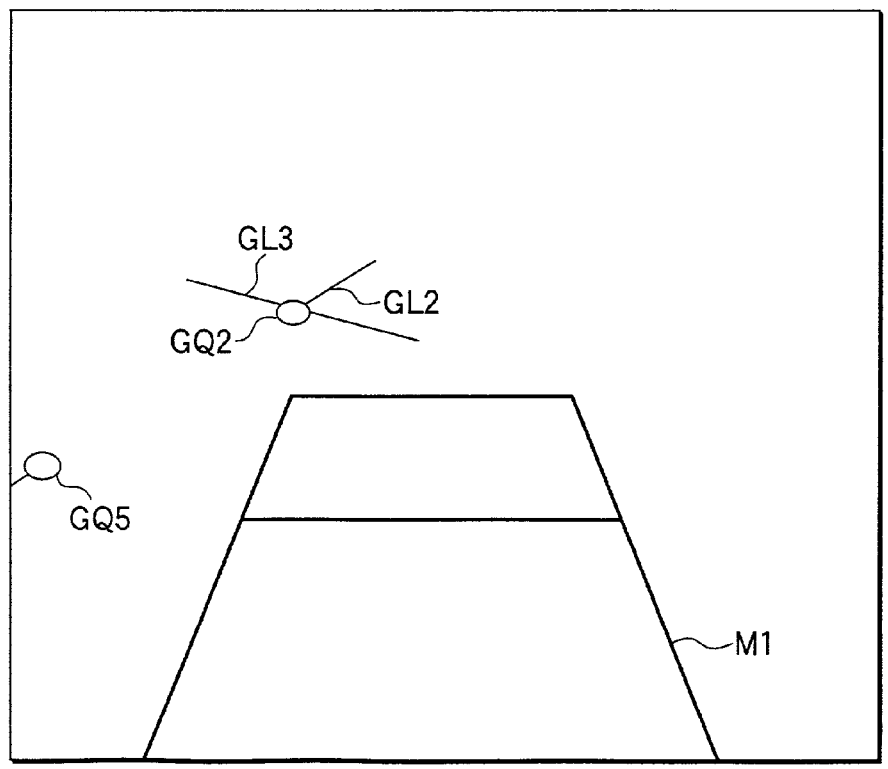
FIG. 29 explains guide marks according to the fifth embodiment of the invention.

In case the guides F, G are used, the screen is complicated when both guides F and G are displayed at all times. It is detected whether the wheel is being turned right or left and the corresponding guide is displayed together with the guide M1 as shown in FIG. 29.

Figure 30:
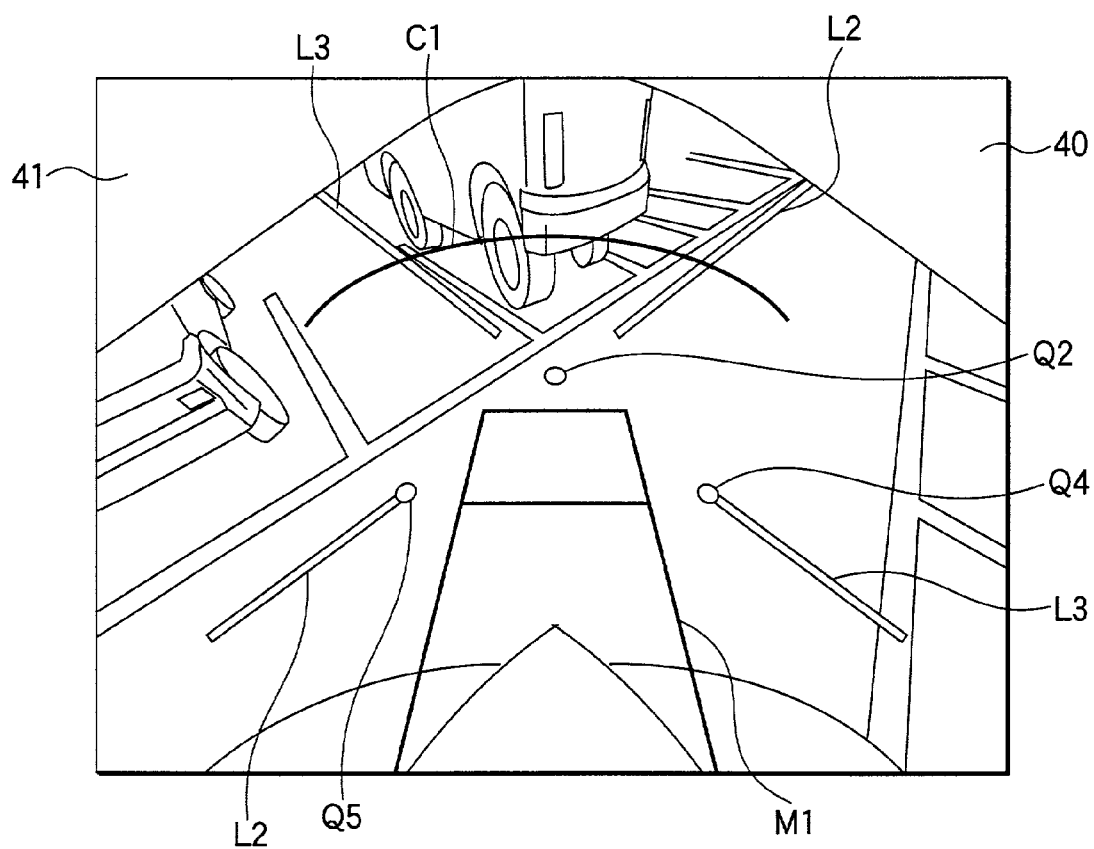
FIG. 30 explains guides according to the sixth embodiment of the invention.

FIG. 30 explains the guides according to the sixth embodiment of the invention. The guides used in FIG. 30 are a guide line C1 at an appropriate distance from the rear end of the vehicle as well as the guide lines L2, L3, M1 and the guide marks Q2, Q4, Q5 used in the fourth embodiment. The guide line C1 is a line over which a vehicle may move when the vehicle is backed. This means that it is possible to guide a vehicle into an area where the guide line C1 is superimposed by operating the wheel. In case the vehicle is backed with the wheel at the maximum right/left steering angle, the vehicle moves just at the end of the guide line C1.

When parking a vehicle using the guide line C1, the driver can roughly guide the vehicle by using the guide line C1 as a guide in the initial stage of the parking procedure. Then the driver can guide the vehicle into the parking position by using other guide lines L2, L3 and guide marks Q2, Q4, Q5.

While straight lines in the real space are represented in straight lines like parking border lines through viewpoint-conversion of an image shot by a wide angle camera, displaying the image over the entire monitor screen results in distorted end portions on the screen. In this example, the image is not displayed in the upper corners 40, 41.

Figure 31:
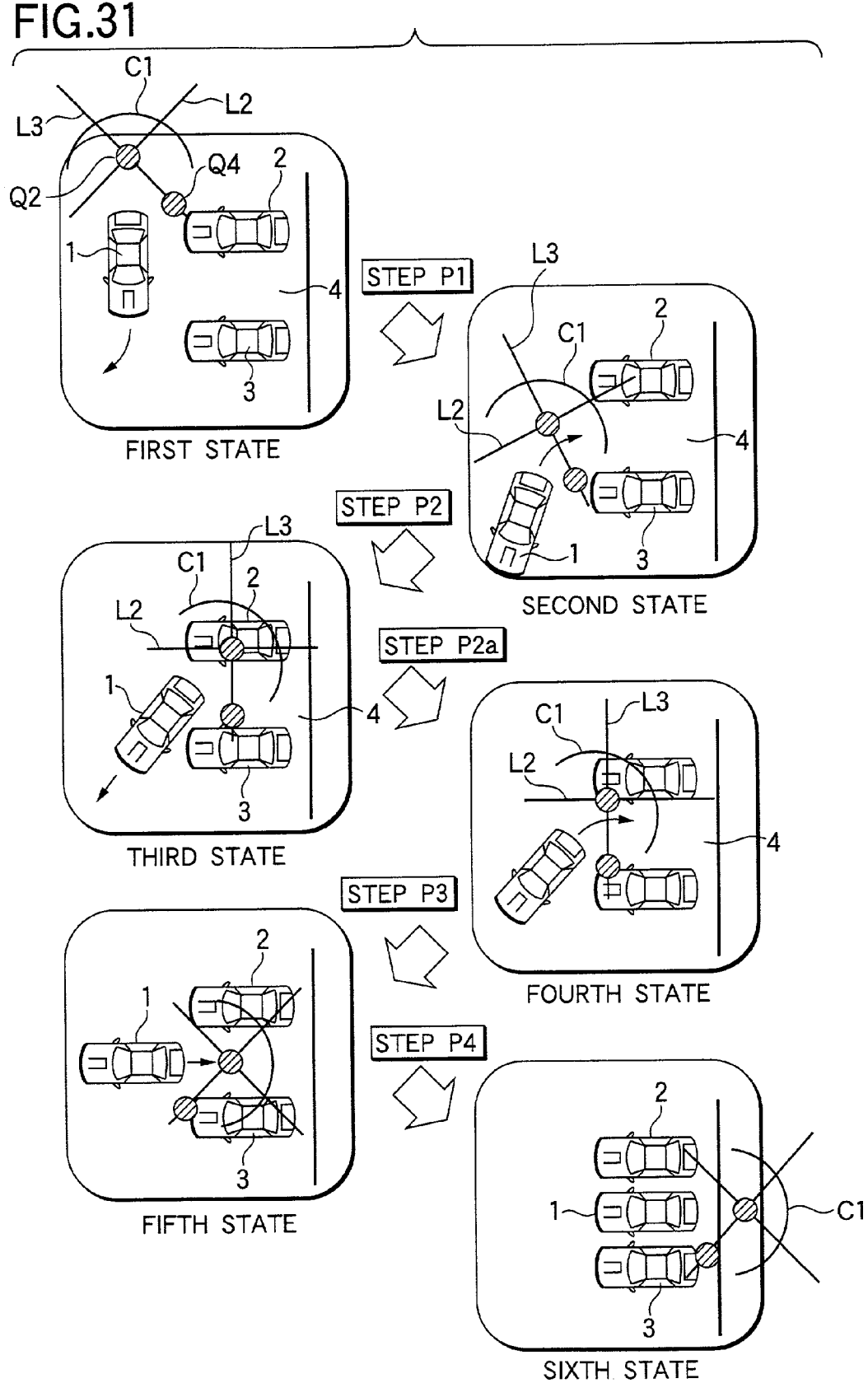
FIG. 31 is a schematic view showing the side-by-side parking procedure using guides according to the sixth embodiment of the invention.

FIG. 31 explains the side-by-side parking using the guide line C1 shown in FIG. 30. FIG. 31 corresponds to FIG. 24. In FIG. 31, the guide mark Q2 and the guide mark Q4 are connected by the guide line L3.

When the criteria for determining completion of step P1 in the side-by-side parking are met, the driver advances the vehicle straight (step P2a) after step P2 or backs the vehicle straight to correct the vehicle position to the optimum position. In case the guide line C1 according to this embodiment is not displayed in correcting the vehicle position, a wide space is required for execution of step P2a. In this embodiment, the guide line C1 is displayed so that it is possible to properly determine completion of step P1 (start of step P2) as mentioned later. This saves the space required for correction of vehicle position.

This is because it is not necessary to constantly place the vehicle 45 degrees slanted away from the parking space at the completion of step P1. This is because it is made easy to determine whether the vehicle will come into contact with the adjacent vehicle by referring to the guide line C1. The space required for executing each step refers to the space ahead of the parking space.

In step P1 of the embodiment, the vehicle is halted at an angle away from the parking space 4 while the vehicle has passed through the front of the parking space 4 and the front end of the vehicle is facing in the direction opposite to the parking space 4. The vehicle need not necessarily parked slantwise but may be parked at a right angle to the parking space. In this case, the space required for parking is wider than when parked slantwise.

In case the end of the guide line C1 facing the parking space is considerably displaced toward the parking space 4 from the vehicle 3 adjacent to the parking space 4 and closer to the vehicle, backing the vehicle with the wheel at the maximum steering angle will bring the vehicle to the position considerably biased toward the parking space from the adjacent vehicle 3, that is, the vehicle may collide with the adjacent vehicle 2 beyond the parking space. In this case, the driver slightly advances the vehicle toward the adjacent vehicle 3 before the parking space to correct the vehicle position.

On the other hand, in case the end of the guide line facing the parking space 4 is considerably displaced toward the adjacent vehicle 3 that is adjacent to the parking space 4 and closer to the vehicle, backing the vehicle with the wheel at the maximum steering angle will collide with the adjacent vehicle 3. In this case, the driver backs the vehicle toward the adjacent vehicle 2 before the parking space to correct the vehicle position.

In any case, the driver makes adjustments so that the end of the guide line C1 facing the parking space 4 will not come in contact with the side of the adjacent vehicle 3 facing the parking space 4 that is adjacent to the parking space 4 and closer to the vehicle. In this way, by using the guide line C1, it is possible to roughly guide the vehicle to the start position of step P2 as the initial stage of parking.

In step P2, the driver backs the vehicle 1 with the wheel at the maximum steering angle and aligns the guide line L2 in parallel with the parking space 4 or left side of the adjacent vehicle 2 as well as aligns the guide line L3 in parallel with the parking space 3 or front end of the adjacent vehicle 2 or adjacent vehicle 3. Afterwards, the driver follows the same procedure as the second embodiment to complete parking.

The initial position of a vehicle being parked is closely related to the extent of the travel area required in parking procedure. In case a sufficiently ample area cannot be provided ahead of the parking position, the area required for parking may not be secured depending on the parking start position, thus requiring repeated attempts. By using the guide line C1 of the embodiment, it is possible to roughly guide the vehicle at the initial stage of parking and the extent of the travel area required for parking is no more dependent on the vehicle being parked. Even in case a sufficiently ample area cannot be provided ahead of the parking position, it is made easy to park a vehicle by using the guide line C1 of this embodiment. Note that the guide line C1 is preferably drawn in a location corresponding to the position three to four meters away from the rear of the vehicle in the real space.

Figure 32:
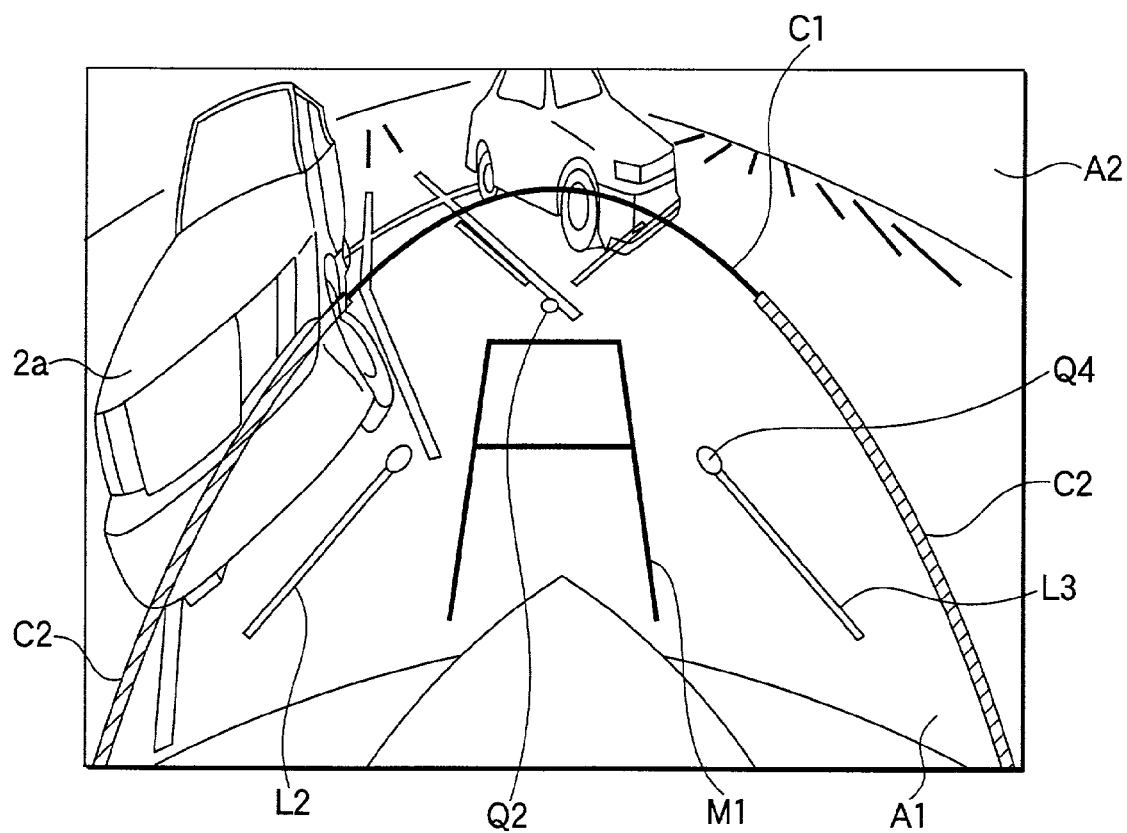
FIG. 32 explains guides according to the seventh embodiment of the invention.

FIG. 32 explains guides according to the seventh embodiment of the invention. The guides of this embodiments are basically the same as those of the sixth embodiment, with the guide line C1 somewhat revised. In this embodiment, the monitor screen is split into the nearby area A1 at the rear of the vehicle and the remaining area (distant area) A2. The area A1 and the area A2 are split by parabola-shaped boundaries (C1, C2). The area A1 shows an image that has undergone viewpoint conversion to provide a straight line in the real space in straight representation on the screen. The area A2 shows an image that has undergone viewpoint conversion to provide a panoramic view of the rear of the vehicle. Both images are continuous at the boundaries to form a single image. The guide line, same as that of the sixth embodiment, is drawn on the boundaries. The remaining boundary C2 is drawn in a different color from that of the guide line C1.

Displaying two differently converted images on a single screen so that the images may be continuous on the boundaries results in a straight line extending across two areas A1, A2 being represented as a polygonal line changing its direction at a boundary. In case the guide line C1 or boundary C2 is not specified on the screen, the driver feels a sense of incongruity because the parking border line that is assumed as a straight line is represented in a polygonal line on the screen.

However, when the boundaries C1, C2 for two differently converted images are explicitly shown on the screen, these boundaries C1, C2 act as symbols to split the two screen areas A1, A2 so that the driver can intuitively recognize the screen area A1 and the screen area A2 as separate areas, not a single continuous area. Thus, a polygonal line changing its direction at a boundary does not perplex the driver. In this way, the driver recognizes two differently converted screen areas as separate areas when the two areas are displayed to continue at a boundary, by specifying the boundaries. This is advantageous in that the driver does not feel a sense of incongruity when the images are not continuous at boundaries.

An image displayed in the image area A1 is an image in the close proximity of the vehicle that has undergone viewpoint conversion so that a straight line in the real space will remain straight even after viewpoint conversion. On the contrary, an image displayed in the image area A2 is an image that has undergone panoramic viewpoint conversion so that an image outside the proximity of the vehicle will look natural.

As shown in FIG. 26, in case an image in the close proximity of the vehicle is available as well as an image in the image area A2, parking is made possible. Displaying an image produced by the processing to convert a straight line in the real space to a straight line on the screen renders the guide lines L2, L3 straight lines on the screen and the parking border lines on the road surface indicating the parking space as straight lines. This facilitates alignment of the guide lines used in parking with the parking border lines on the road surface.

In the conversion processing to convert a straight line in the real space to a straight line on the screen, the wider the image angle is, the greater the distortion of display of a three-dimensional object at the ends of the screen. Thus, displaying on the screen the entire image acquired using a camera capable of shooting a range wider than the range displayed in FIG. 26 provides a more distorted view as the image approaches an end of the screen. In order to reduce a sense of incongruity caused by such distortion, it is preferable to cut out an image in the close proximity of the vehicle from the entire image and fill the monitor screen with the resulting image.

In this way, the range displayed by applying the processing to convert a straight line in the real space to a straight line on the screen is limited to the close proximity of a vehicle. In parking procedure, it is necessary to grasp the situation near the vehicle as well as a wide range to help check safety of the surroundings and understand the general position of the vehicle, in order to assure safe and comfortable parking.

This embodiment thus displays a panoramically converted image in the screen area A2 in order to help grasp the situation of a wide range. This allows the driver to grasp the situation of a wide range in the screen area A2 that employs panoramic conversion as well as grasp the situation of the close proximity of the vehicle in the screen area A1 that employs the processing to convert a straight line in the real space to a straight line on the screen, thus assuring safe and easy parking.

As mentioned earlier, in a screen configuration where the boundaries C1, C2 are explicitly shown and the screen areas A1, A2 are specifically separated, one boundary where a vehicle may pass through when backed is represented as the guide line C1 and the other boundary where a vehicle will never pass through when backed is represented as the guide line C2. These boundaries are specified, such as represented in different colors for clear discrimination. Displaying the guide line C1 using the boundaries of the screen areas A1 and A2 eliminates the need for displaying new guide lines on the screen thus providing an easy-to-watch parking guide.

Figure 33:
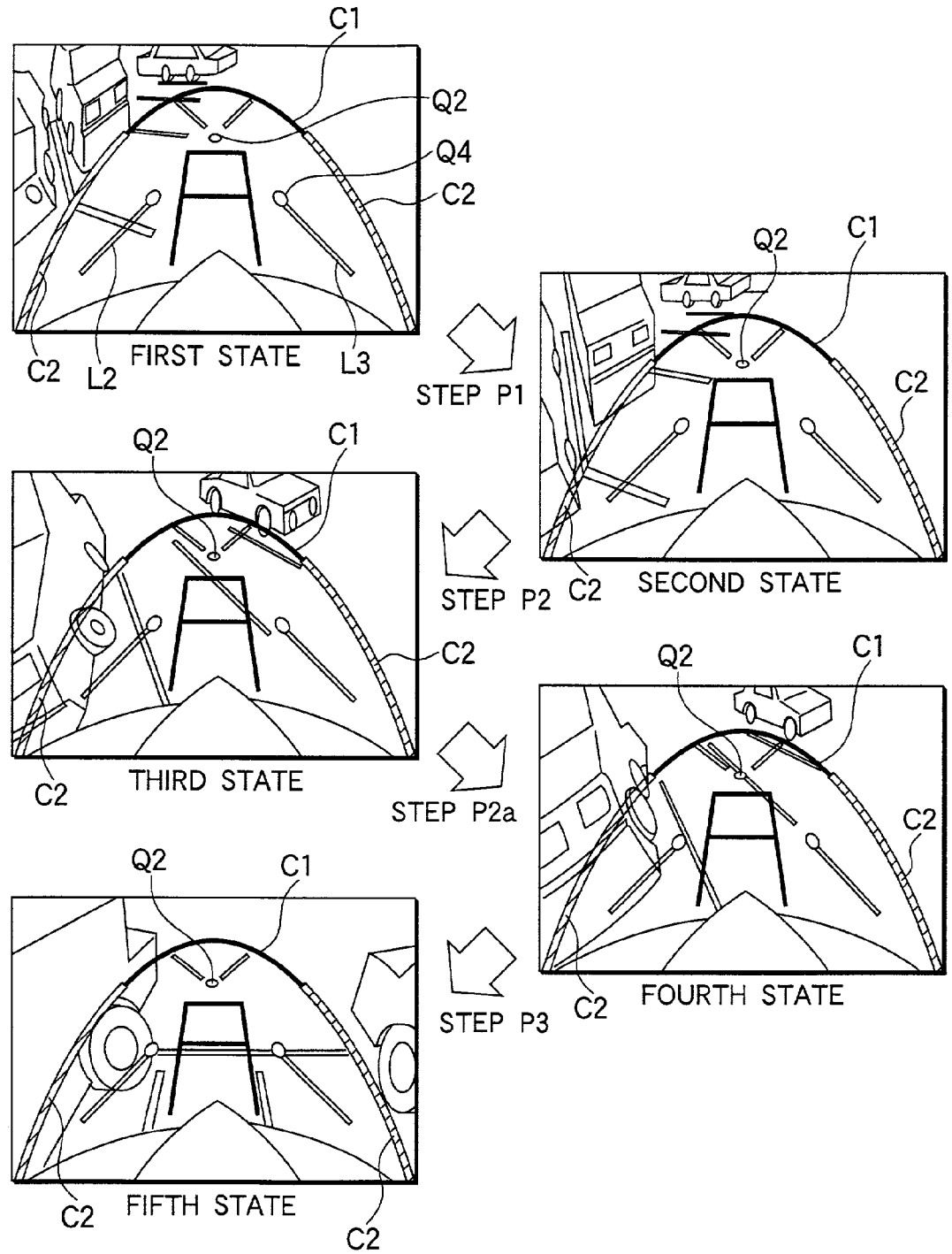
FIG. 33 is a monitor screen transition diagram assumed when side-by-side parking procedure is followed using guides according to the seventh embodiment of the invention.

FIG. 33 is a transition diagram of the monitor screen displayed when side-by-side parking is performed using the guides shown in FIG. 32. Determination on the initial position of start of parking is the same as that in FIG. 31, so that the corresponding description is omitted. In this embodiment also, the driver can easily park the vehicle even when the space ahead of the parking space is not sufficient. Further in this embodiment, the driver can check safety in the close proximity of the vehicle as well as check safety at a distance while watching the image in the area A2. This assures safe parking.

Figure 34:
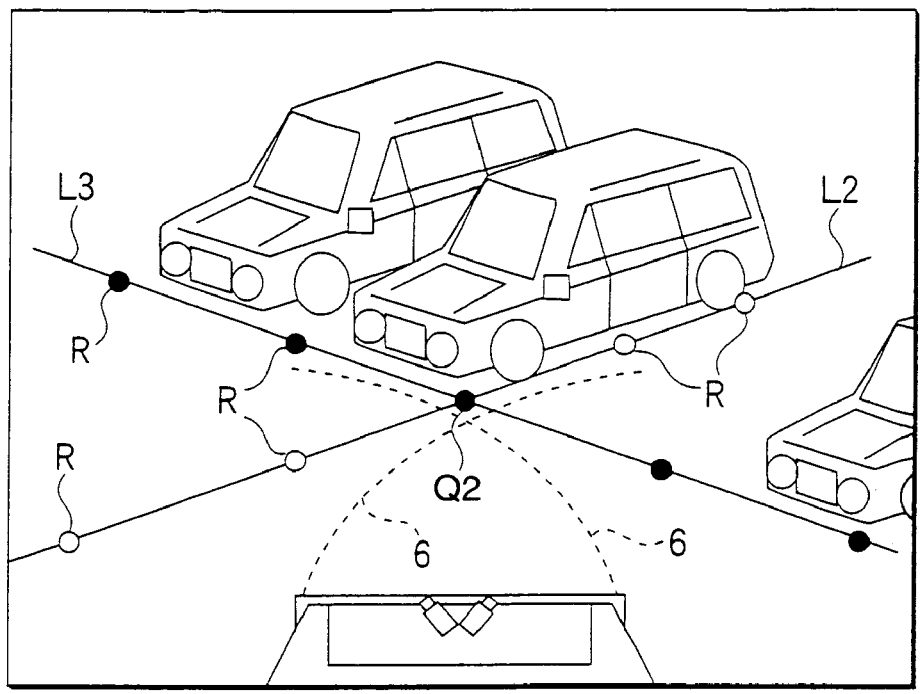
FIG. 34 explains guides according to the eighth embodiment of the invention.

FIG. 34 explains guides according to the eighth embodiment of the invention. This embodiment displays a plurality of points R on the straight lines L2, L3 as well as the guide mark Q2. The points R are arranged in predetermined spacings (for example 1 meter) from the guide mark Q2. In this embodiment, the straight lines L2 and L3 are hidden and the predicted locus 6 of the maximum steering angle to be displayed is hidden. The relation between the locus 6 and the straight lines L2, L3 is the same as that in the first and second embodiments explained referring to FIGS. 6 and 7.

In this way, displaying only the guide mark Q2 and points R eliminates an easy-to-watch display without complicated information. A driver skilled in parking may desire correct decision on the distance by using the points R rather than complicated screen display. Thus, guides of this embodiment and guides of the seventh embodiment may be provided for example to let the driver choose which guides to use.

Figure 35:
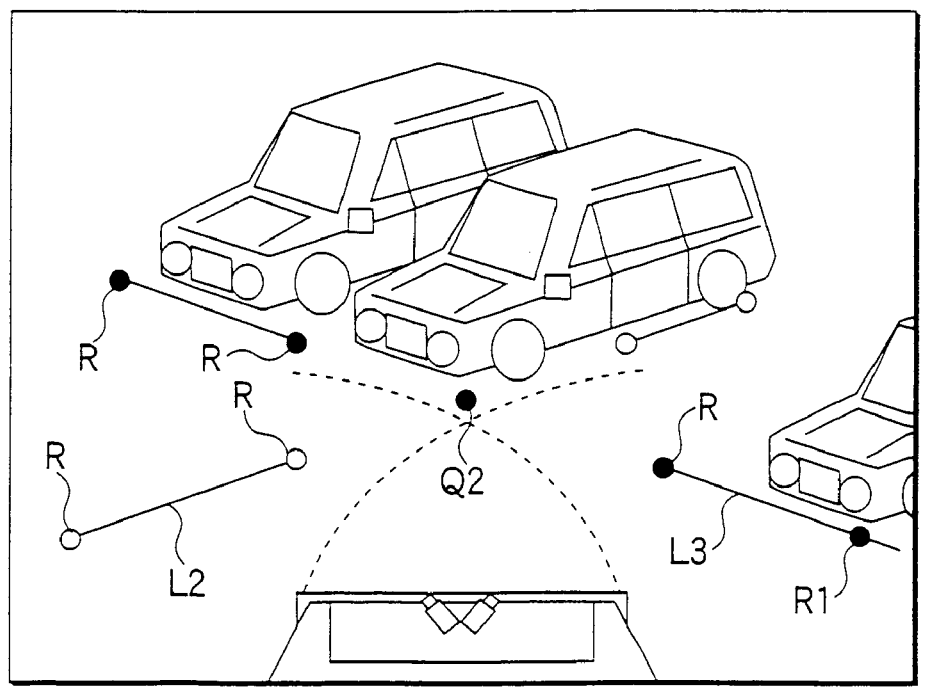
FIG. 35 explains guides according to the ninth embodiment of the invention.

FIG. 35 explains guides according to the ninth embodiment of the invention. This embodiment is a variation of the eighth embodiment and also displays the guide mark Q2 and the plurality of points R. This embodiment is different in that the segments L2, L3 connecting adjacent points R are discretely displayed. This embodiment has the same advantage as the eighth embodiment.

Figure 36:
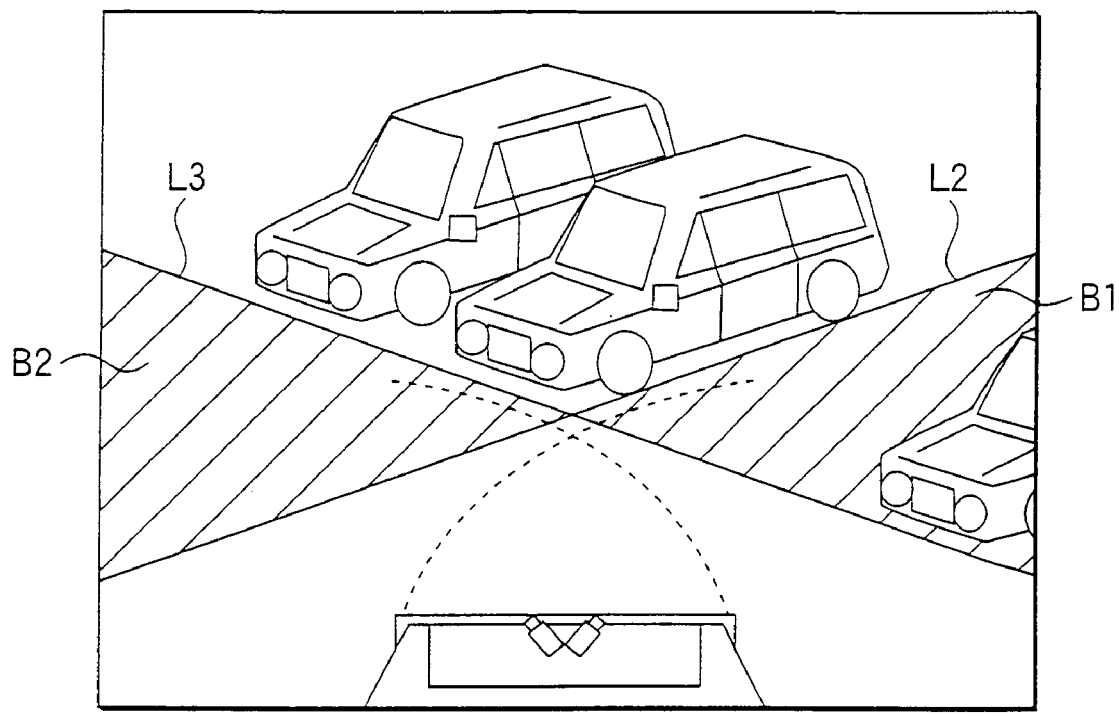
FIG. 36 explains guides according to the tenth embodiment of the invention.
Figure 37:
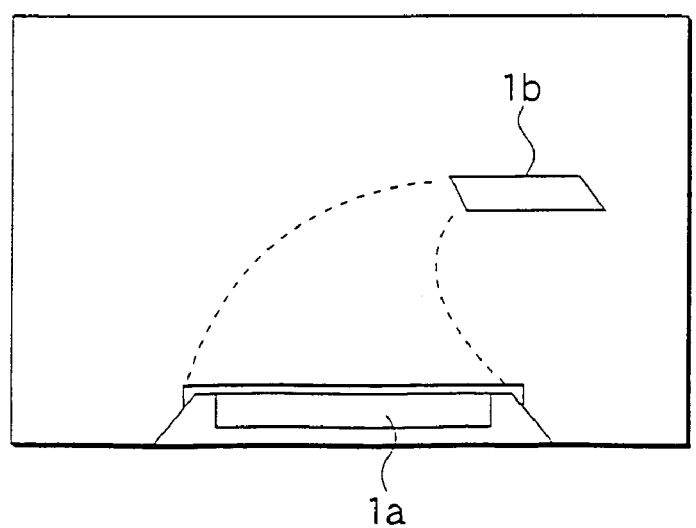
FIG. 37 explains side-by-side parking according to the related art.
Figure 38A:
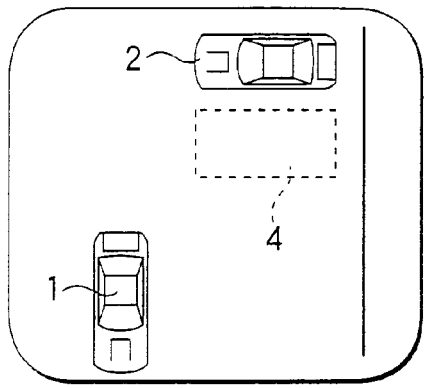
FIG. 38A is a schematic view showing the related art relation between the position of the vehicle and the position of another vehicle in accordance with the side-by-side parking.
Figure 38B:
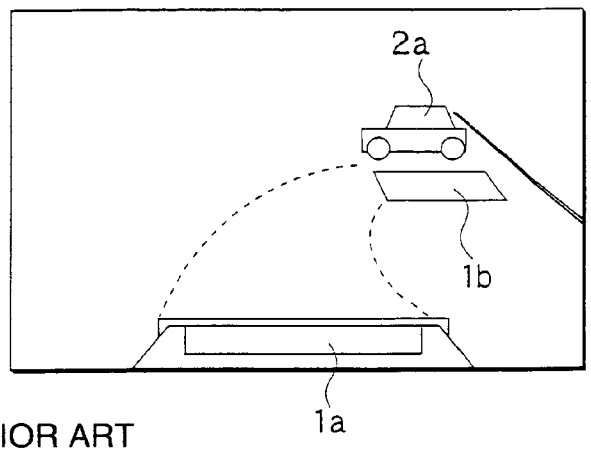
FIG. 38B shows the monitor screen in the state of FIG. 38A.

FIG. 36 explains guides according to the tenth embodiment of the invention. This embodiment displays the areas B1 and B2 shown in FIG. 36 out of the areas split by the straight lines L2, L3 in a color different from that of the other areas. This renders the boundaries of the areas straight lines L2, L3 and provides a simple display.

While detailed display method for the guide lines C1, C2, M1, L2, L3, FL2, FL3, GL2 is not described in the aforementioned embodiments, displaying the guide line M1 for example with a uniform line width causes the guide line M1 to be floated over the road surface image, which gives the driver a sense of incongruity. To eliminate this sense of incongruity, the rules of perspective are preferably used to display the guide lines. That is, a closer line is displayed in a bold line and a farther line is displayed in a thin line. This allows the driver to see the guide lines C1, C2, M1, L2, L3, FL2, FL3, GL2 at the same height as the road surface.

In case the aforementioned parking assistance apparatus is applied to an operating vehicle, creating guide data to suit the target vehicle in advance and storing the data into a storage allows the guide lines C1, C2, M1, L2, L3 and marks Q2, Q4, Q5 to be superimposed on a camera-picked up image. In case the apparatus is applied to vehicles of different shapes or sizes, optimum guide data to support individual vehicles must be created and stored into storage. Creation of the guide data is preferably made by service personnel on a paid or free basis when a vehicle is delivered in order to create guide data optimally tailored to the user's garage.

While the guide lines L2, L3 are assumed as data displayed as straight lines (segments) on the monitor screen, which occurs since the camera-picked up image is converted to an image free from lens distortion (i.e., parking border lines as displayed as straight lines) in the aforementioned embodiments, the guide lines L2, L3 may be displayed on the monitor screen while distorted similarly to an image shot by a wide angle camera, if wishing to display a distorted image picked-up by a wide angle camera.

While the guide line L2 is parallel to a tangent line to the predicted travel locus at the maximum steering angle in the aforementioned embodiments, the predicted travel locus may vary on the screen in accordance with the variation in the steering angle. In this case, the guide line L2 is drawn in parallel with and outwardly from the tangent line to the predicted travel locus in order to move the guide line on the screen in response to a variation in the steering angle, thereby helping predict the contact with adjacent vehicles depending on the steering angle.

While the invention has been described in terms of the specific embodiments for easy understanding of the inventive technology, the invention is not limited to the illustrative embodiments but may be implemented with specific configuration changed within the scope of the claims.

The invention displays guides that can measure the required outer distance along the predicted backing locus of a vehicle. Thus, it is possible to avoid possible contact with other vehicles in advance. It is also possible for a beginner to perform parking in accordance with the side-by-side parking and end-to-end parking procedures that have been employed.

What is claimed is:

1. Parking assistance apparatus that displays on a screen an image picked up by image picking-up means mounted on a vehicle, wherein said parking assistance apparatus comprises control means for superimposing on said screen a guide that is parallel to a line that is tangent to an outer predicted travel locus of said vehicle, the guide being spaced apart from said outer predicted travel locus at a predetermined distance in an outward direction relative to the outer predicted travel locus when said vehicle is being backed up while a steering wheel of said vehicle is being turned.

2. Parking assistance apparatus according to claim 1, wherein said guide is a guide line.

3. Parking assistance apparatus according to claim 2, wherein the control means comprises means for superimposing on said screen an auxiliary guide line for enhancing said guide line, said auxiliary line extending in a direction that crosses said guide line at a predetermined angle.

4. Parking assistance apparatus according to claim 3, wherein the angle formed by said guide line and said auxiliary line is 90 degrees.

5. Parking assistance apparatus according to claim 3, wherein said screen displays a mark indicating a width of the vehicle or a mark indicating a width of the vehicle including a predetermined distance margin.

6. Parking assistance apparatus according to claim 2, wherein said control means comprises means for superimposing on said screen a second guide that is parallel to a second line that is tangent to an outer predicted travel locus of said vehicle, the second guide being spaced apart at a predetermined distance from said outer predicted travel locus in an outward direction relative to the outer predicted travel locus when said vehicle is being backed up while a steering wheel of said vehicle is positioned at a maximum steering angle in the direction opposite to said second guide line.

7. Parking assistance apparatus according to claim 6, wherein said screen displays a mark indicating a width of the vehicle or a mark indicating a width of the vehicle including a predetermined distance margin.

8. Parking assistance apparatus according to claim 2, characterized in that said guide line is displayed as a border between two areas having contrasting colors.

9. Parking assistance apparatus according to claim 1, characterized in that said picked up image displayed on said screen has undergone processing to remove lens distortion of said image picking-up means.

10. Parking assistance apparatus according to claim 1, characterized in that said picked up image displayed on said screen has undergone viewpoint conversion processing to convert an image picked up by said image picking-up means to an image picked up by an imaginary image picking up means installed at an arbitrary position.

11. Parking assistance apparatus according to claim 10, characterized in that said picked up image has undergone the viewpoint conversion processing where a straight line picked up by said image picking-up means is represented as a straight line in an image after viewpoint conversion.

12. Parking assistance apparatus according to claim 1, characterized in that said parking assistance apparatus displays said guide lines in accordance with the rules of perspective.

13. Parking assistance apparatus according to claim 1, wherein said guide comprises a plurality of collinear points equidistantly spaced apart by a predetermined distance.

14. Parking assistance apparatus according to claim 1, further comprising
control means including means for splitting said screen into a first area for displaying an area in close proximity of a vehicle and a second area for displaying the area except said area in close proximity of the vehicle,
means for viewpoint-converting an image of an area in close proximity of a vehicle to an image where a straight line picked up by said image picking-up means is represented as a straight line on the screen and displaying the resulting image in said first area,
means for displaying in said second area an image of the neighborhood of a vehicle as a panoramically viewpoint-converted image continuous to the image displayed in said first area, and
means for displaying a boundary between said first area and said second area.

15. Parking assistance apparatus according to claim 1, further comprising control means for superimposing on said picked up image a guide indicating a boundary of an area where said vehicle can pass through when said vehicle is backed.

16. Parking assistance apparatus that displays on a screen the image picked up by image picking-up means mounted on a vehicle, wherein said parking assistance apparatus comprises control means for superimposing on said screen a guide that is parallel to a line that is tangent to an outer predicted travel locus of said vehicle, the guide being spaced apart from said outer predicted travel locus at a predetermined distance in an outward direction relative to the outer predicted travel locus when said vehicle is being backed up while a steering wheel of said vehicle is positioned at a maximum steering angle.

17. Parking assistance apparatus according to claim 16, wherein said guide is a guide line.

18. Parking assistance apparatus according to claim 17, characterized in that the control means comprises means for superimposing on said screen an auxiliary guide line for enhancing said guide line, said auxiliary line extending in a direction that crosses said guide line at a predetermined angle.

19. Parking assistance apparatus according to claim 18, wherein the angle formed by said guide line and said auxiliary line is 90 degrees.

20. Parking assistance apparatus according to claim 18, wherein said screen displays a mark indicating a width of the vehicle or a mark indicating a width of the vehicle including a predetermined distance margin.

21. Parking assistance apparatus according to claim 17, wherein said control means comprises means for superimposing on said screen a second guide that is parallel to a second line that is tangent to an outer predicted travel locus of said vehicle the second guide being spaced apart at a predetermined distance from said outer predicted travel locus in an outward direction relative to the outer predicted travel locus when said vehicle is being backed up while a steering wheel of said vehicle is positioned at a maximum steering angle in the direction opposite to said second guide line.

22. Parking assistance apparatus according to claim 21, wherein said screen displays a mark indicating a width of the vehicle or a mark indicating a width of the vehicle including a predetermined distance margin.

23. Parking assistance apparatus according to claim 17, characterized in that said guide line is displayed a border between two areas having contrasting colors.

24. Parking assistance apparatus according to claim 16, characterized in that said picked up image displayed on said screen has undergone processing to remove lens distortion of said image picking-up means.

25. Parking assistance apparatus according to claim 16, characterized in that said picked up image displayed on said screen has undergone viewpoint conversion processing to convert an image picked up by said image picking-up means to an image picked up by an imaginary image picking up means installed at an arbitrary position.

26. Parking assistance apparatus according to claim 25, characterized in that said picked up image has undergone the viewpoint conversion processing where a straight line picked up by said image picking-up means is represented as a straight line in an image after viewpoint conversion.

27. Parking assistance apparatus according to claim 16, characterized in that said parking assistance apparatus displays said guide lines in accordance with the rules of perspective.

28. Parking assistance apparatus according to claim 16, wherein said guide comprises a plurality of collinear points equidistantly spaced apart by a predetermined distance.

29. Parking assistance apparatus according to claim 16, further comprising
- control means including means for splitting said screen into a first area for displaying an area in close proximity of a vehicle and a second area for displaying the area except said area in close proximity of the vehicle,
- means for viewpoint-converting an image of an area in close proximity of a vehicle out to an image where a straight line picked up by said image picking-up means is represented as a straight line on the screen and displaying the resulting image in said first area,
- means for displaying in said second area an image of the neighborhood of a vehicle as a panoramically viewpoint-converted image continuous to the image displayed in said first area, and
- means for displaying a boundary between said first area and said second area.

30. Parking assistance apparatus according to claim 16, further comprising control means for superimposing on said picked up image a guide indicating a boundary of an area where said vehicle can pass through when said vehicle is backed.

* * * * *

UNITED STATES PATENT AND TRADEMARK OFFICE
CERTIFICATE OF CORRECTION

PATENT NO. : 7,012,549 B2
APPLICATION NO. : 10/128016
DATED : March 14, 2006
INVENTOR(S) : Kazufumi Mizusawa et al.

It is certified that error appears in the above-identified patent and that said Letters Patent is hereby corrected as shown below:

Column 24, line 46 insert --as-- between "displayed" and "a"

Column 25, line 11 delete "out"

Signed and Sealed this

Tenth Day of October, 2006

JON W. DUDAS
*Director of the United States Patent and Trademark Office*